(12) United States Patent
Patel

(10) Patent No.: US 6,990,999 B2
(45) Date of Patent: Jan. 31, 2006

(54) DIGITALLY CONTROLLED MODULAR VALVE SYSTEM

(75) Inventor: Kishor J. Patel, Mukwonago, WI (US)

(73) Assignee: KJP Investments LLC, Mukwonago, WI (US)

( * ) Notice: Subject to any disclaimer, the term of this patent is extended or adjusted under 35 U.S.C. 154(b) by 16 days.

(21) Appl. No.: 10/828,509

(22) Filed: Apr. 20, 2004

(65) Prior Publication Data

US 2005/0139274 A1    Jun. 30, 2005

Related U.S. Application Data

(60) Provisional application No. 60/467,866, filed on May 5, 2003.

(51) Int. Cl.
F15B 13/043    (2006.01)

(52) U.S. Cl. .......................... 137/625.64; 137/596.16; 137/884

(58) Field of Classification Search .......... 137/596.16, 137/625.64, 884
See application file for complete search history.

(56) References Cited

U.S. PATENT DOCUMENTS

| 3,012,576 | A |   | 12/1961 | Williams |
|---|---|---|---|---|
| 3,287,022 | A |   | 11/1966 | Soechting .................... 277/188 |
| 3,513,876 | A | * | 5/1970 | Tarbox ......................... 137/884 |
| 3,589,387 | A | * | 6/1971 | Raymond .................... 137/884 |
| 3,976,098 | A | * | 8/1976 | Raymond .................... 137/884 |
| 4,011,891 | A | * | 3/1977 | Knutson et al. ........ 137/625.64 |
| 4,359,064 | A | * | 11/1982 | Kimble ........................ 137/884 |
| 4,453,565 | A | * | 6/1984 | Neff ............................ 137/884 |
| 4,491,151 | A | * | 1/1985 | Neff ............................ 137/884 |
| 4,907,615 | A | * | 3/1990 | Meyer et al. ........... 137/625.64 |
| 5,394,903 | A |   | 3/1995 | Tominaga ............... 137/596.13 |
| 5,913,333 | A |   | 6/1999 | Biener et al. ........... 137/625.64 |
| 6,012,490 | A |   | 1/2000 | Tajima et al. ................ 137/884 |
| 6,038,858 | A |   | 3/2000 | Mies ............................ 60/436 |
| 6,192,928 | B1 |  | 2/2001 | Knoell et al. ................ 137/596 |
| 6,192,937 | B1 |  | 2/2001 | Fagerlie et al. ......... 137/625.63 |
| 6,196,247 | B1 |  | 3/2001 | Knoell et al. .................. 137/12 |
| 6,234,201 | B1 |  | 5/2001 | Strobel ....................... 137/596 |
| 6,474,353 | B1 |  | 11/2002 | Sturman et al. ................ 137/1 |

OTHER PUBLICATIONS

"Flash No. 10" newsletter by Argo Hytos, dated Aug., 2004.
Data Sheet of HU 4039, published by Argo Hytos dated Jan., 2005.

(Continued)

*Primary Examiner*—Kevin Lee
(74) *Attorney, Agent, or Firm*—Whyte Hirschboeck Dudek SC

(57) ABSTRACT

Valve base module comprises a tank core passage extending within a plane containing a longitudinal axis, said plane oriented in non-perpendicular relation to a surface of said valve housing comprising at least a P, T, A, and B port and standard mounting holes for mounting said valve base module to at least one of a sub-plate or bar manifold. The plane is disposed at an offset angle α relative to a second plane to permit one or more of at least P, T, A, and B ports to connect a first surface to an opposing second surface of the valve housing to form one or more of at least P', T', A', and B' ports that permit the following additional modules to be mounted thereto: pilot control PCM, thermal insulating TIM, power supply PSM, pressure reducing PRM, diagnostic DM, load sense LSM, position feedback sensor PFSM, and manual override MOM.

59 Claims, 16 Drawing Sheets

OTHER PUBLICATIONS

Data Sheet of RE 23 327, published by Rexroth Bosch Group, dated Feb., 2003.
Basic Principles and Components of Fluid Technology—The Hydraulic Trainer, vol. 1, published by Rexroth Hydraulics, dated Oct., 1991.
Daman Products Company, Inc., Directional Valve Patterns, pp. 194-195, date unknown.
Parker Hannifin Corporation, Industrial Hydraulic Valves Catalog HY14-2502/US, pp. I-III, XV, A1, A32, A39, A73, A99, A124, 2003.

* cited by examiner

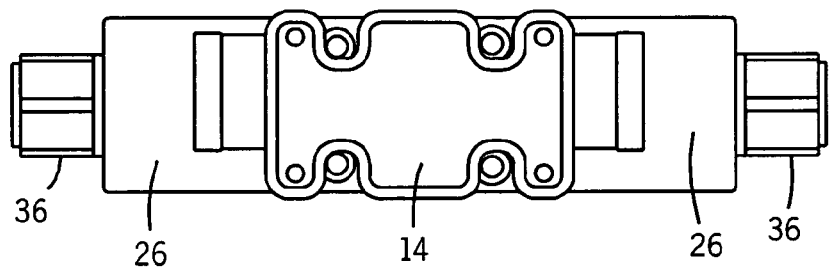
FIG. 1-A
(PRIOR ART)
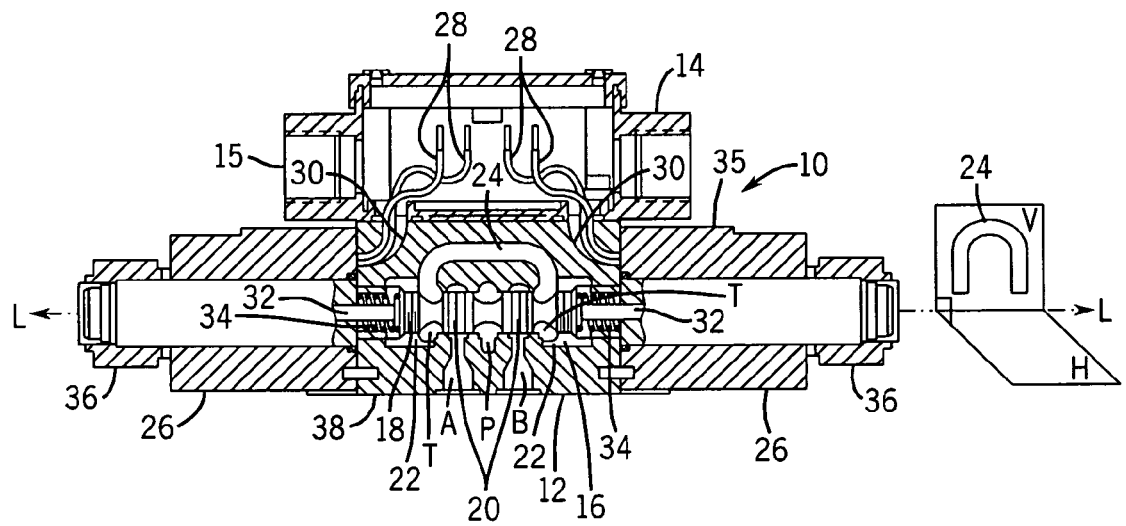
FIG. 1-B
(PRIOR ART)
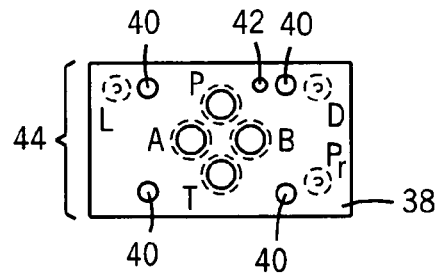
FIG. 1-C
(PRIOR ART)

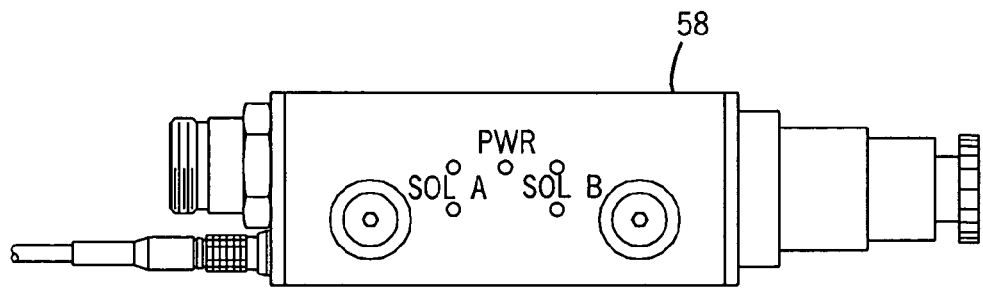
FIG. 2-A
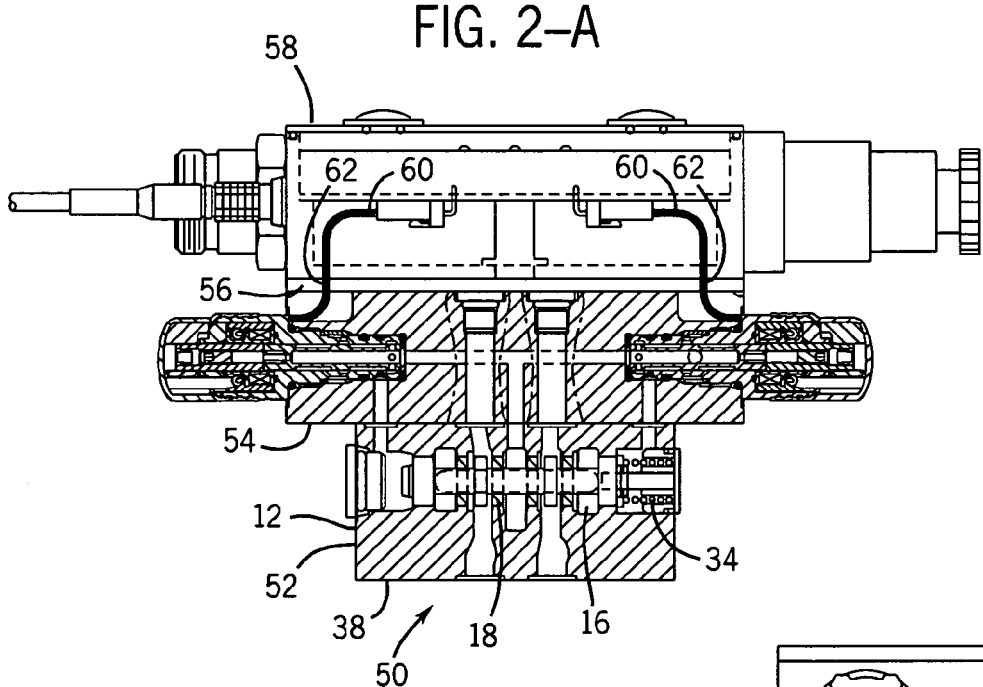
FIG. 2-B
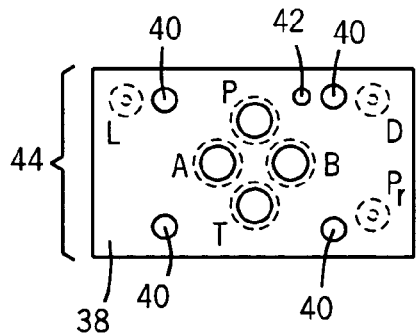
FIG. 2-C
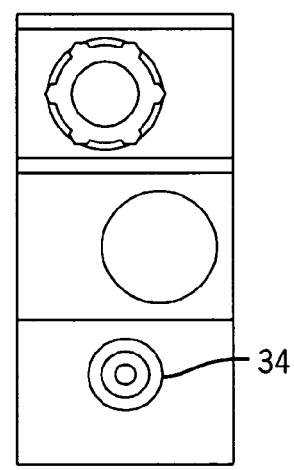
FIG. 2-D

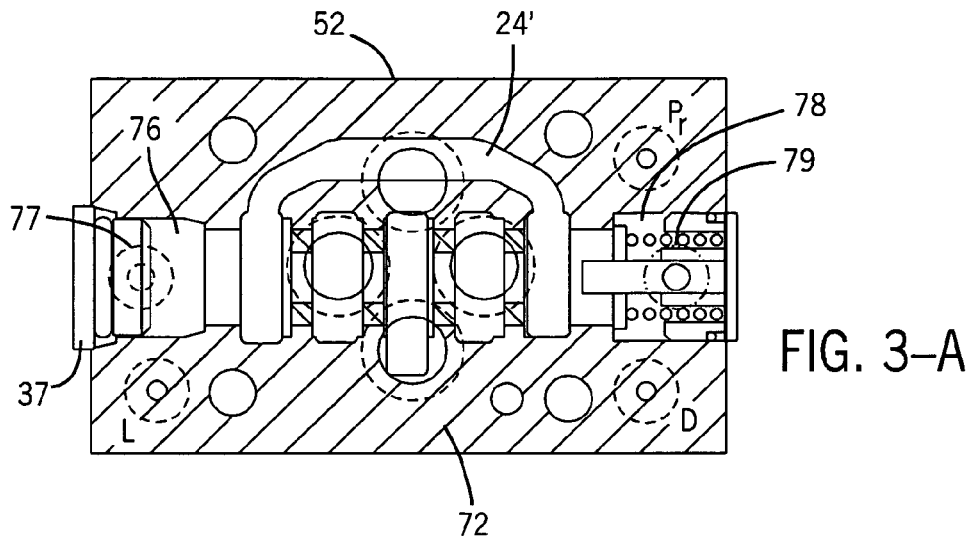
FIG. 3-A
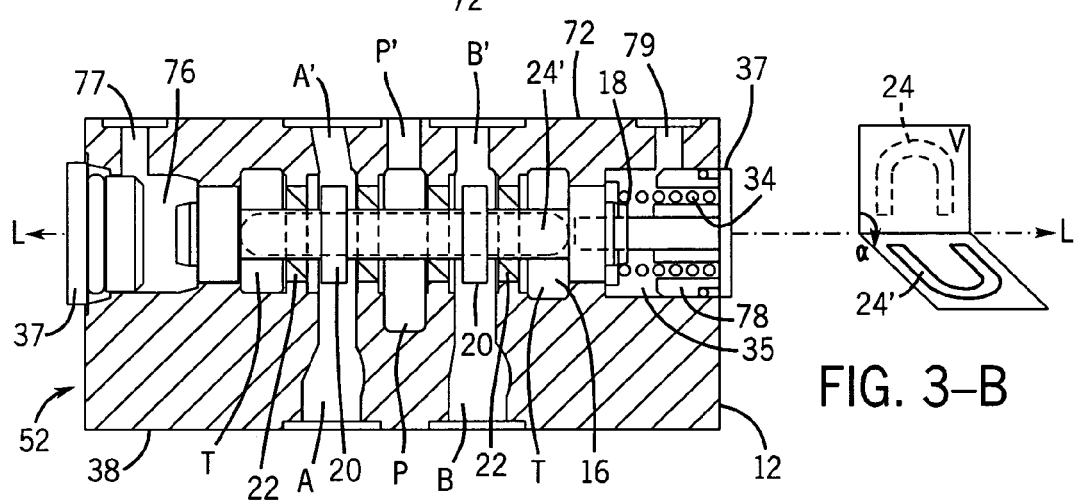
FIG. 3-B
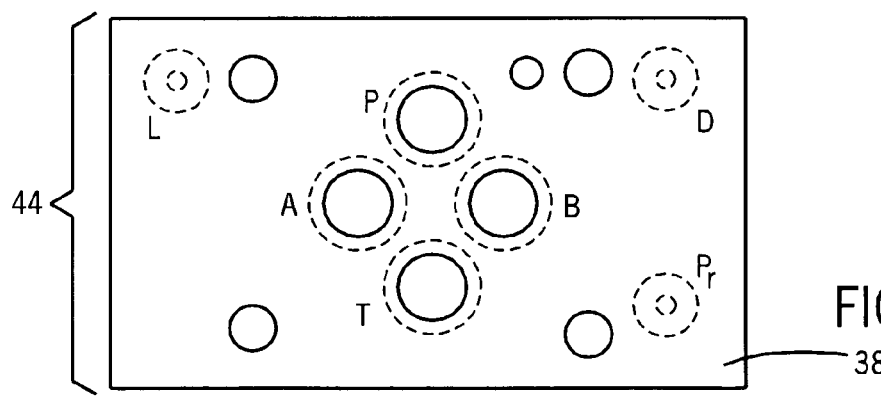
FIG. 3-C

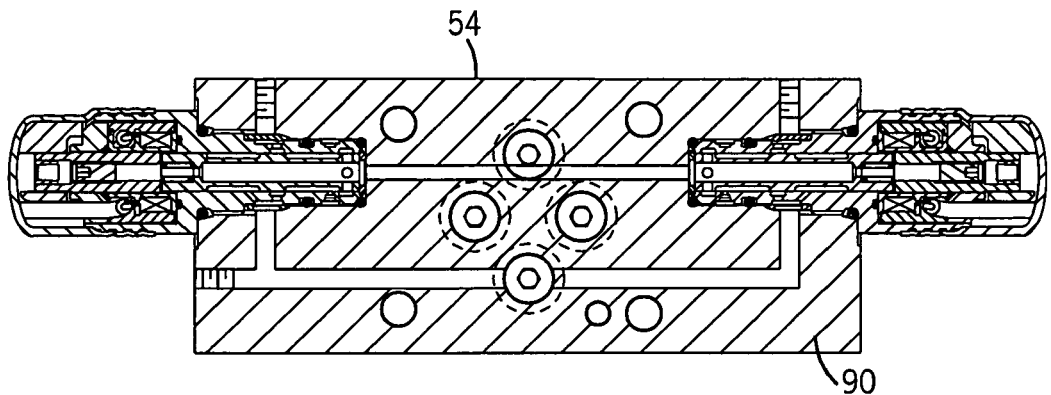
FIG. 4-A
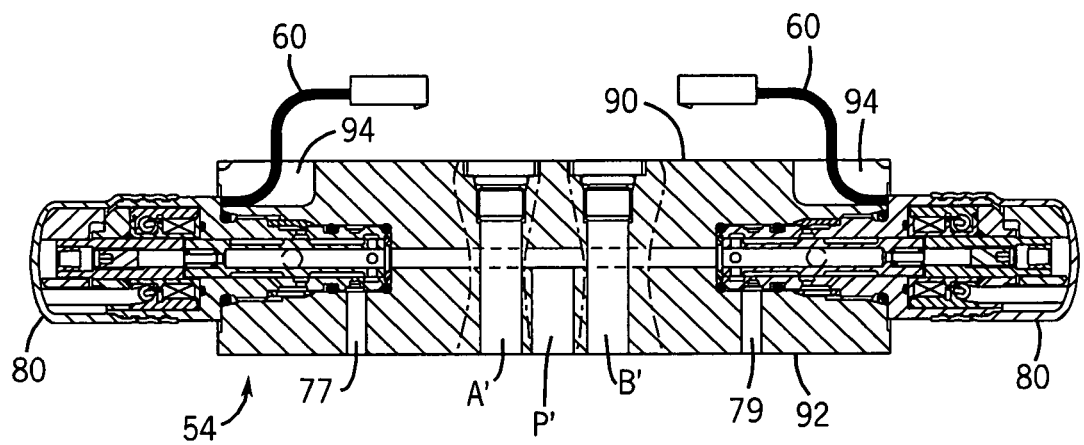
FIG. 4-B
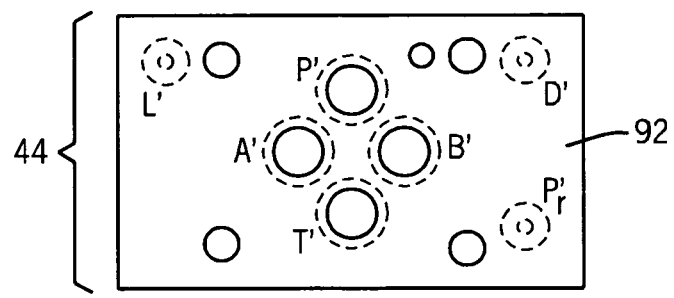
FIG. 4-C

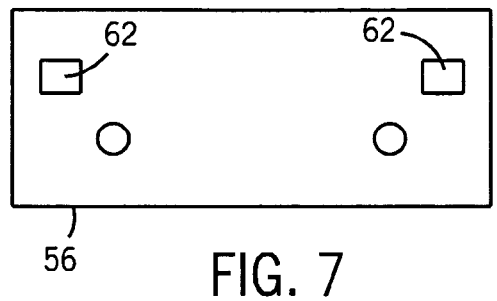
FIG. 7
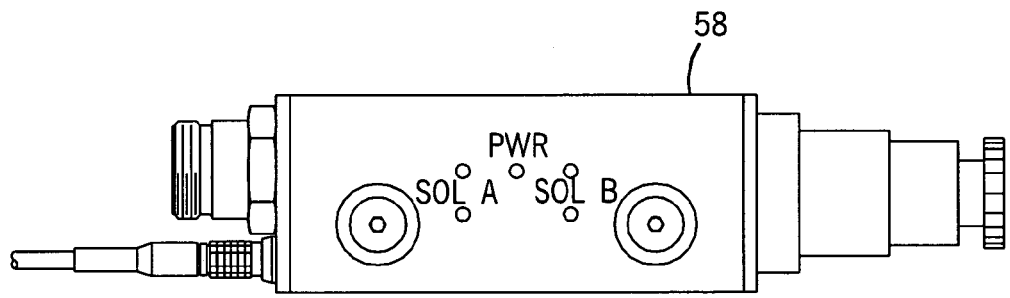
FIG. 8-A
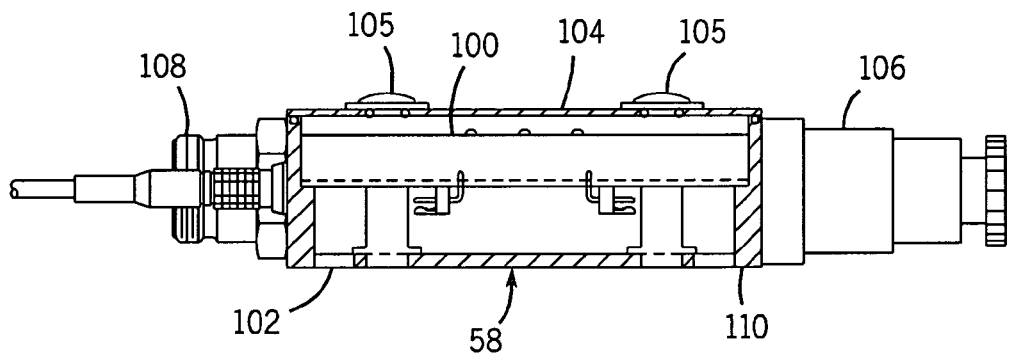
FIG. 8-B
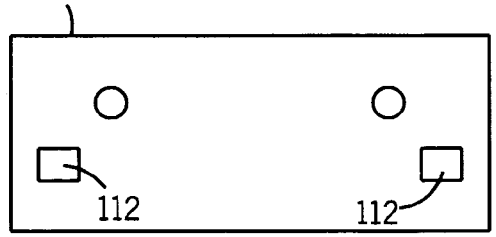
FIG. 8-C

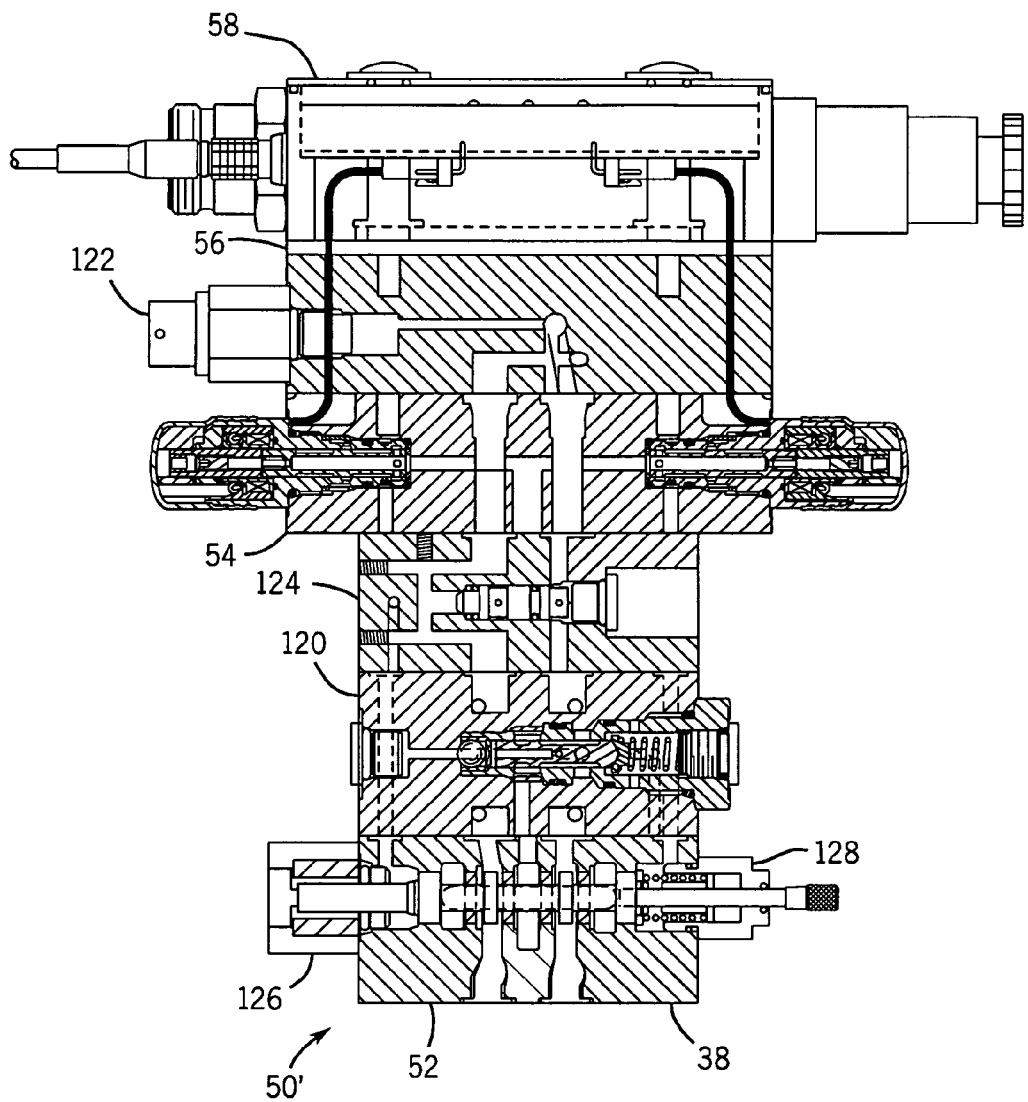
FIG. 9-B

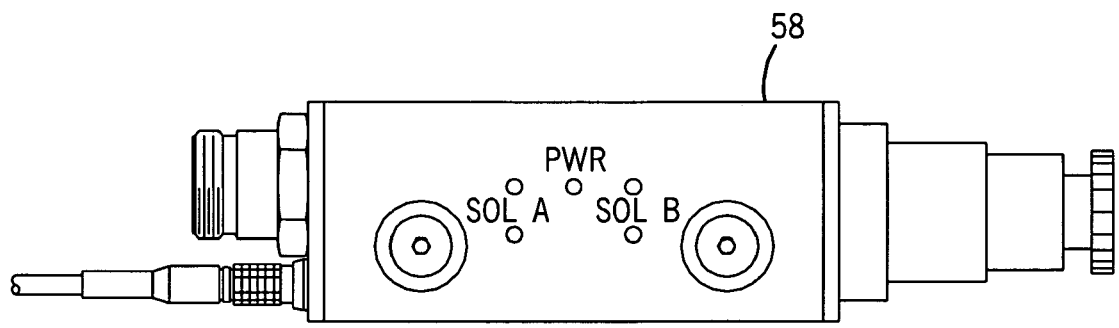
FIG. 9-A
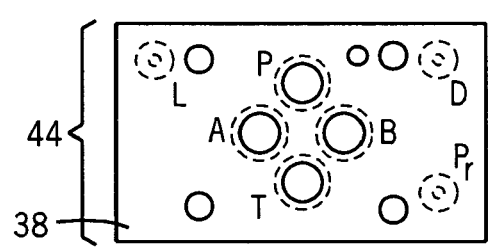
FIG. 9-C
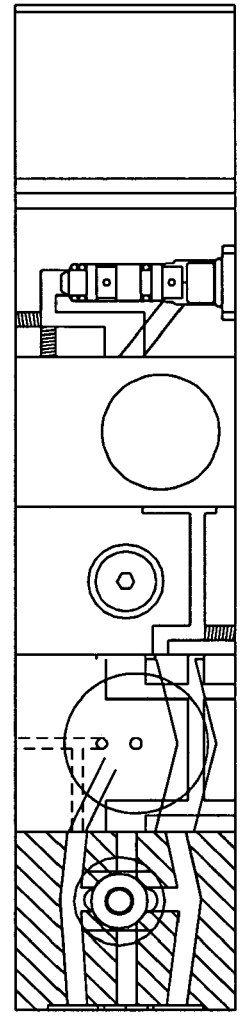
FIG. 9-D

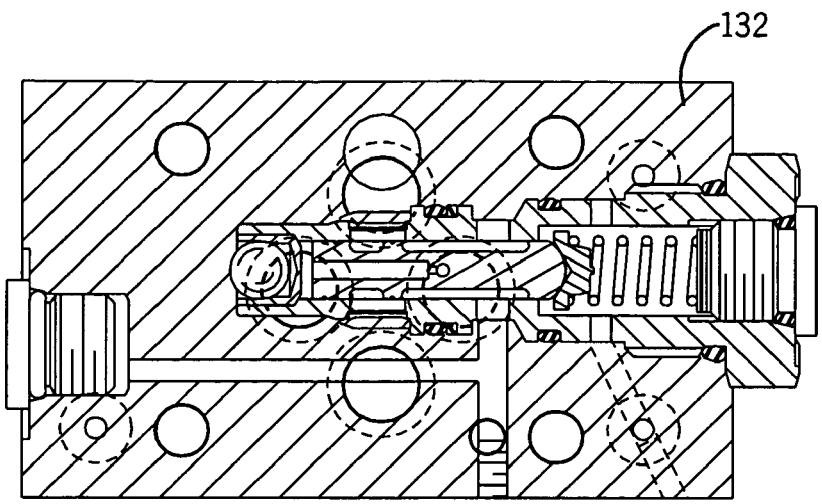
FIG. 10-A
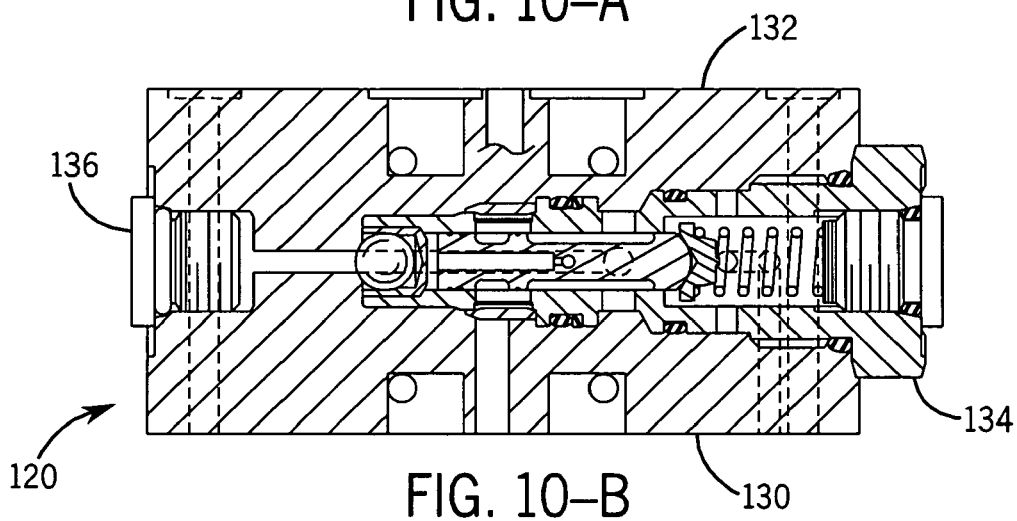
FIG. 10-B
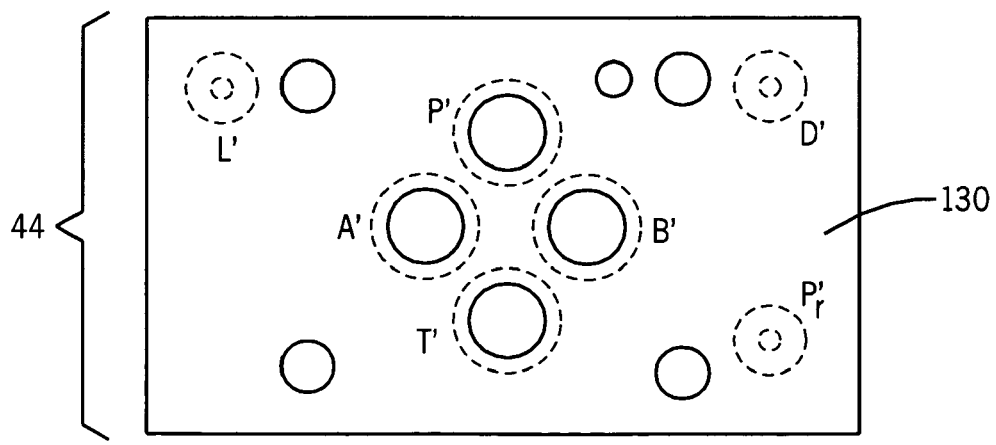
FIG. 10-C

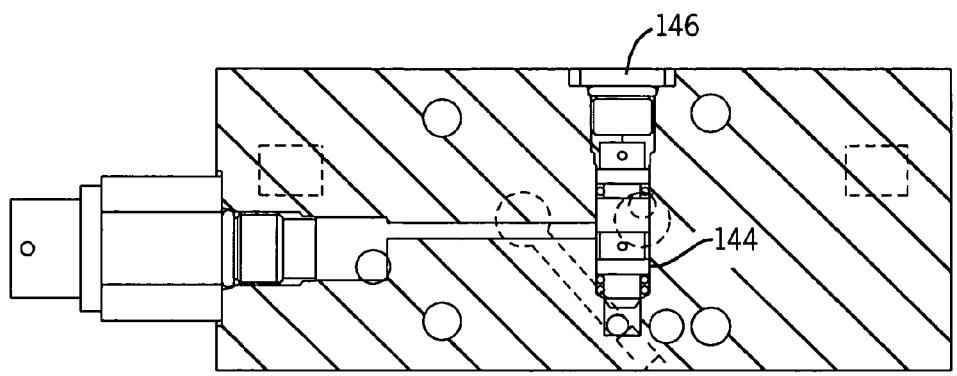
FIG. 12-A
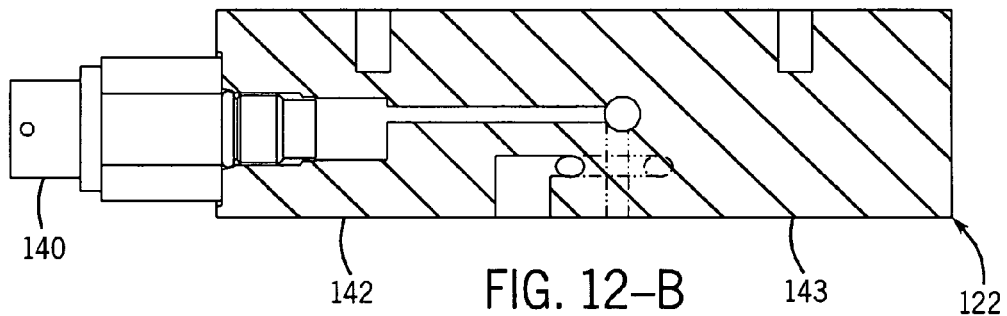
FIG. 12-B
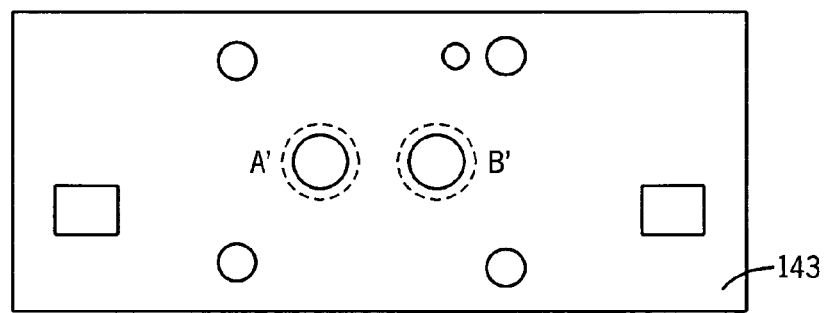
FIG. 12-C

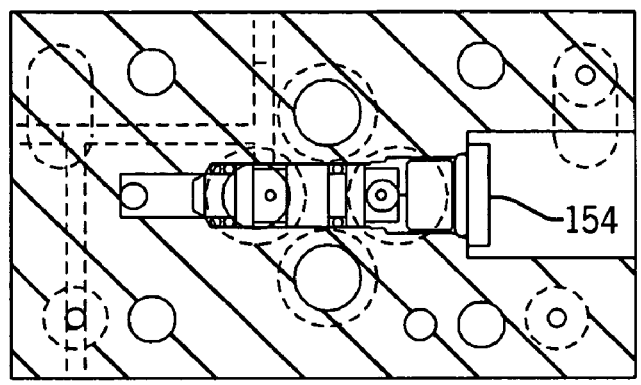
FIG. 13-A
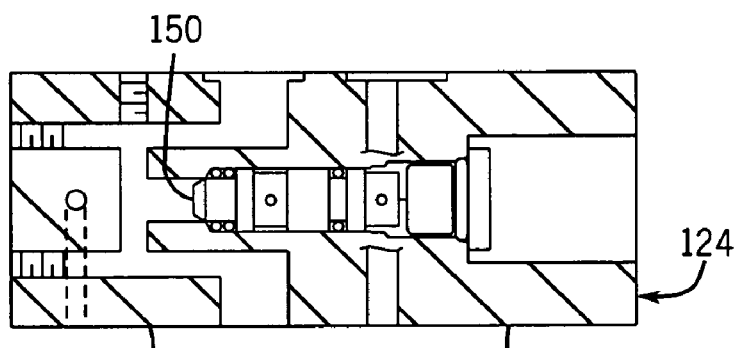
FIG. 13-B
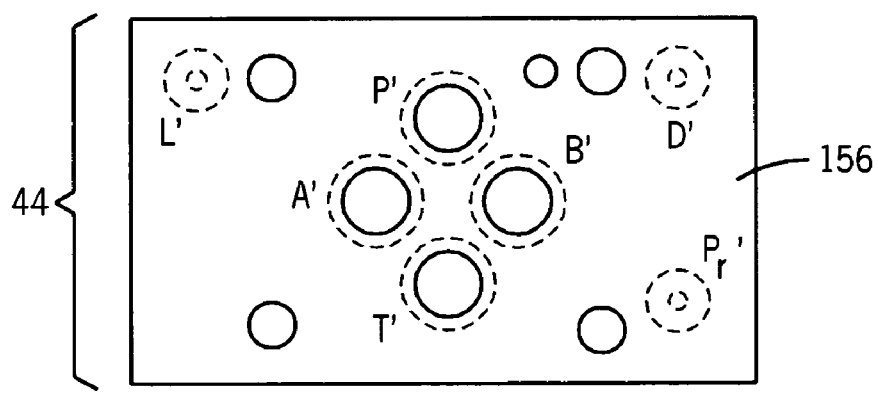
FIG. 13-C

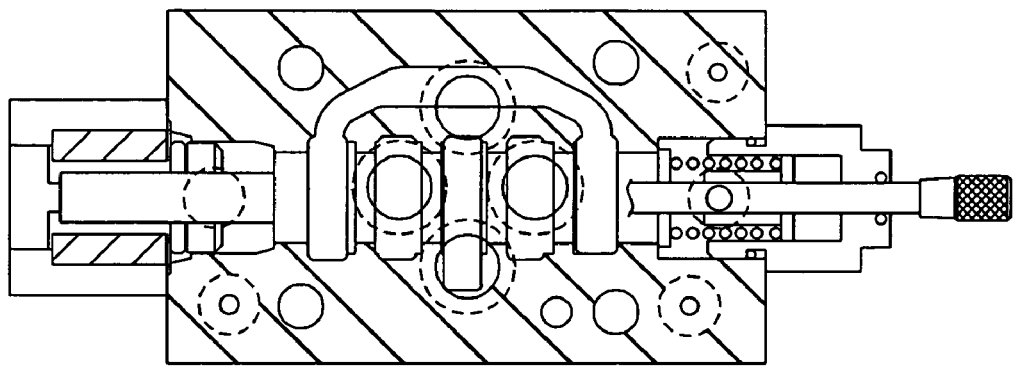
FIG. 14-A
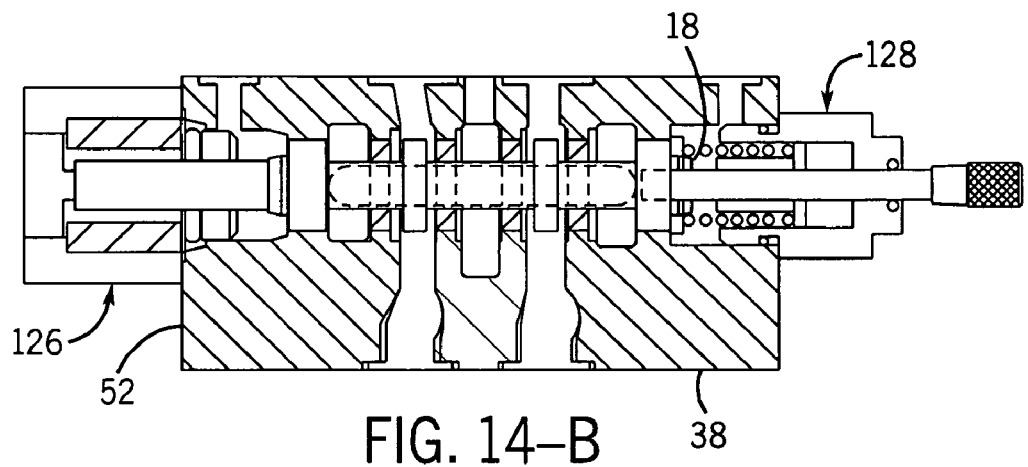
FIG. 14-B
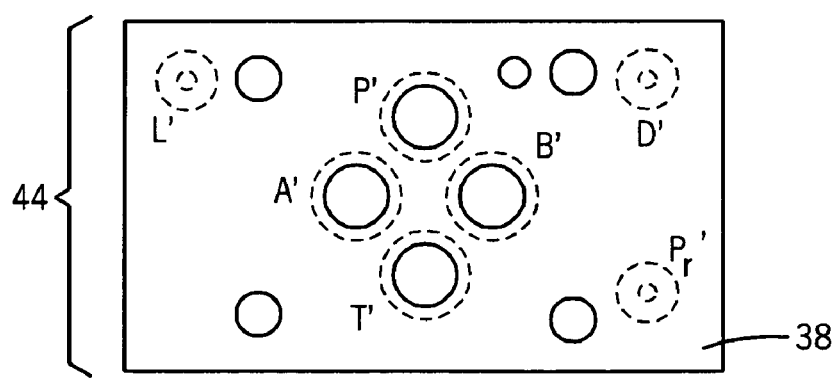
FIG. 14-C

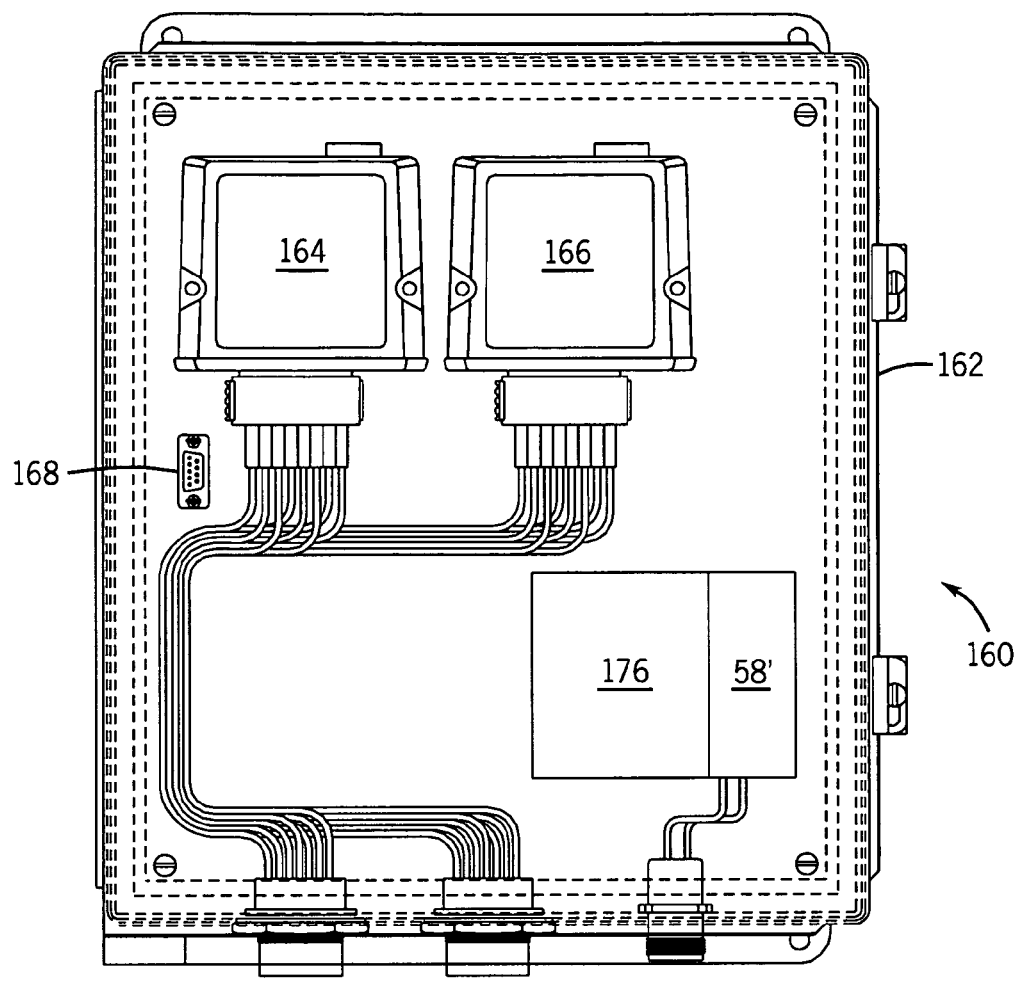
FIG. 17-A
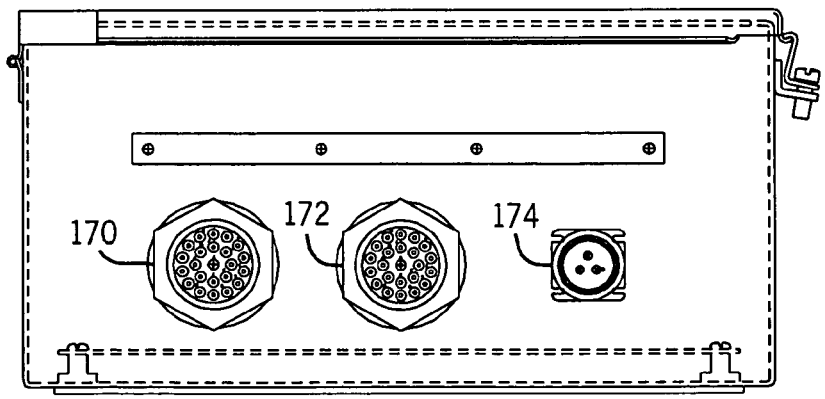
FIG. 17-B

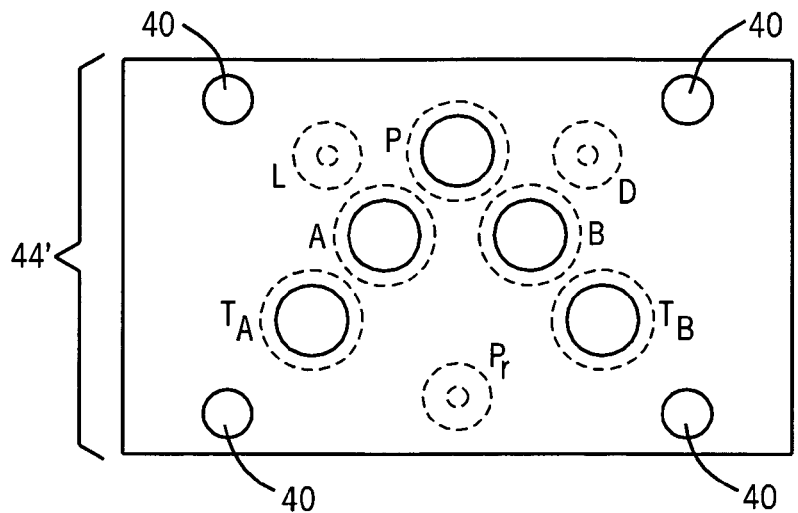
FIG. 18
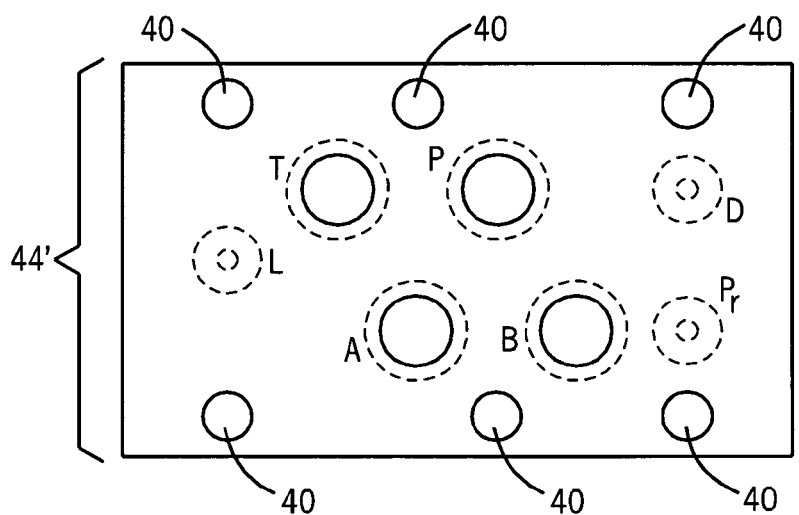
FIG. 19
| NFPA D02 | | |
| NFPA D03 | CETOP 3 | NG6 |
| NFPA D05 | CETOP 5 | NG10 |
| NFPA D05H | CETOP 5H | NG10 |
| NFPA D05HE | | |
| NFPA D06 | | |
| NFPA D07 | | |
| NFPA D08 | CETOP 8 | NG25 |
| NFPA D10 | CETOP 10 | NG32 |
FIG. 20

DIGITALLY CONTROLLED MODULAR VALVE SYSTEM

CROSS-REFERENCES TO RELATED APPLICATIONS

This application claims priority under 35 U.S.C. § 119(e) to Provisional Patent Application Ser. No. 60/467,866, filed May 5, 2003, the disclosure of which is incorporated by reference.

BACKGROUND OF THE INVENTION

1. Field of the Invention

This invention relates generally to modular control valve systems, and more specifically, to improvements therein for industrial, mobile, and other market applications.

2. Description of Related Art

Referring generally, valves are devices that regulate (i.e., start, stop, or otherwise control) fluid flow using a moveable valve element (e.g., a ram, ball, cone, poppet, rotary spool, sliding spool, and the like), which allows access to or obstructs various passageways therewithin the device. Many types of valves are, of course, well-known, and the valve elements may generally be controlled manually, mechanically, pneumatically, hydraulically, magnetically, and electrically, or by various combinations thereof. In addition, the moveable valve element can be either direct-operated or pilot-operated, controlled in either an on-off or proportional fashion, and operated either without feedback or with servo-feedback.

Valves are commonly used to regulate the flow, the pressure, and the direction of a fluid, and are, accordingly, commonly classified according to three primary types of uses—namely flow control valves, pressure control valves, and directional control valves.

Flow control valves regulate fluid flow within a system. Many types of flow control valves are well-known, including, for example, ball valves, gate valves, globe valves, needle valves, and the like.

Pressure control valves, on the other hand, regulate valve pressure. Again, many types of pressure control valves are well-known, including, for example, relief valves, pressure regulating valves, and the like. Common types of pressure regulating valves (also known as unloading valves) include, for example, sequence valves (for controlling a sequence of events within a system), pressure reducing valves (for maintaining reduced pressure downstream in a system using a higher upstream pressure), and the like. In pneumatic systems, pressure regulating valves are commonly used to reduce system pressure, whereas in hydraulic systems, they are commonly used to unload pumps.

Directional control valves (also known as directional valves, selector valves, transfer valves, and control valves) direct fluid flow to various points in a valve where work will be performed. Moving the valve element back and forth within a longitudinal bore that extends through a valve housing, for example, directs the fluid flow, as will be elaborated upon. The position and speed of the valve element may be controlled by techniques well-known in the art. In pneumatic systems, tank ports (also known as return or exhaust ports) are often vented to the atmosphere, whereas in hydraulic systems, tank ports commonly return fluid flow to tank reservoirs. Directional control valves can be classified in many ways, including, for example, by their types of controlling mechanisms, specific valve functions, the number of ports in a valve housing, the number of positions of the valve elements, or the total number of flow paths provided in the valve in extreme positions. For example, a three-position directional control valve may have one central or neutral position and two extreme positions, whereby if each of the two extreme positions permits two flow paths, a total number of four flow paths are provided. Another common directional control valve classification scheme identifies the type of valve element used therewithin. For example, a sliding spool directional control valve is so-named because of the shape of the valve element that slides back and forth within the valve to cover and uncover various ports in the valve housing. Various spool areas (also known as lands) regulate where the fluids enter and exit the valve through various inlet and outlet ports in the valve housing, thereby performing said work. Many sliding spool directional control valves achieve sealing by closely machining precision-fittings between the sliding spool and longitudinal bore within the valve.

Valves are also commonly classified as two-way, three-way, and four-way valves.

Two-way valves regulate fluid flow through one inlet and one outlet port. More specifically, in a two-way sliding spool directional control valve, the sliding spool moves back and forth, and as it does so, it either allows fluid to flow or not flow into the valve housing. For example, in an "open" position, fluids enter the valve housing from the inlet port, then flow around the shaft of the sliding spool, and then exit through the outlet port, whereas in a "closed" position, the fluid is altogether precluded from entering the valve housing.

Three-way valves regulate fluid flow through one pressure port P, one tank port T, and one working port A (also known as a cylinder port). More specifically, in a three-way sliding spool directional control valve, the sliding spool is operated in one direction, whereby either a return load or a spring acting on the sliding spool returns the same to an original position after the motive force is removed. For example, if the force of a fluid under pressure alters the position of the sliding spool within the longitudinal bore, it may also simultaneously compress a spring at a distal end of the valve housing, whereby once the motive force is removed, the spring returns the sliding spool to its original position within the longitudinal bore. Accordingly, the valve housing connects either i) P to A, or ii) T to A.

Four-way valves regulate fluid flow through one pressure port P, one tank port T, and two working ports A, B. More specifically, in a four-way sliding spool directional control valve, the sliding spool is operated in both directions, whereby motive forces control the position of the sliding spool from both sides of the valve housing. Accordingly, the valve housing connects either i) P to A and T to B, or ii) T to A and P to B.

Valves with even greater numbers of flow direction are also well-known. Still further, the following are also well-known: direct operated valves, such as DO3, DO5, DO5H, DO8, and DO10, and the like; pilot controlled valves, which use a pilot spool to control the sliding spool; on-off valves, including wet and dry armature on-off valves; proportional control valves; servo (also known as feedback) valves; and many techniques for pneumatic, hydraulic, and other valve amplification.

Many other variations and varieties of the foregoing are also well-known in the art, and hereby contemplated.

BRIEF SUMMARY OF THE INVENTION

A valve base module is disclosed, comprising a valve housing having a longitudinal bore extending about a longitudinal axis; a valve element disposed within said longitudinal bore, said valve element having one or more lands that divide said longitudinal bore into a plurality of chambers; and a tank core passage connecting at least some of said chambers, said tank core passage extending within a plane containing said longitudinal axis, said plane oriented in non-perpendicular relation to a surface of said valve housing comprising at least a P, T, A, and B port and standard mounting holes for mounting said valve base module to at least one of a sub-plate or bar manifold.

A modular control valve system is disclosed, comprising four primary modules, including, in addition to the aforementioned valve base module, a pilot control module, thermal insulating module, and power source module. In addition, five additional modules can also be optionally included, and used together with each of the four primary modules either i) separately, or ii) in various combinations therewith, including a pressure reducing module, diagnostic module, load sense module, position feedback sensor module, and manual override module.

Other objects, advantages, and aspects of the present invention will become apparent from the following description. In the description, reference is made to the accompanying drawings, which from a part hereof, and in which there is shown, by way of illustration, one or more preferred embodiments of the present invention. Such embodiments do not necessarily represent the full spirit and scope of the invention, however, and reference is therefore made to the claims for properly interpreting the same.

BRIEF DESCRIPTION OF THE SEVERAL VIEWS OF THE DRAWINGS

Many aspects of the invention will be better appreciated and understood in conjunction with the following drawings and Detailed Description of the Invention, which form integral components of this Specification, in which like reference numerals generally represent like elements, and in which:

FIG. 1 is a prior art control valve, shown in top view (1-A), cross-sectional view (1-B), and partial bottom view (1-C);

FIG. 2 is a digitally controlled modular control valve system, comprising four primary modules, including a valve base module ("VBM"), pilot control module ("PCM"), thermal insulator module ("TIM"), and power supply module ("PSM"), shown in top view (2-A), partial cross-sectional view (2-B), partial bottom view (2-C), and side view (2-D);

FIG. 3 is a detail view of the VBM of FIG. 2, shown in partially cut-away top view (with partial cross-sectionals) (3-A), cross-sectional view (3-B), and partial bottom view (3-C);

FIG. 4 is a detail view of the PCM of FIG. 2, shown in partially cut-away top view (with partial cross-sectionals) (4-A), cross-sectional view (4-B), and partial bottom view (4-C);

FIG. 7 is a detail view of the TIM of FIG. 2, shown in top view;

FIG. 8 is a detail view of the PSM of FIG. 2, shown in top view (8-A), partial cross-sectional view (8-B), and partial bottom view (8-C);

FIG. 9 is a modular control valve system comprising four primary modules, including the VBM, PCM, TIM, and PSM of FIG. 2, and five optional modules, including a pressure reducing module ("PRM"), diagnostic module ("DM"), load sense module ("LSM"), position feedback sensor module ("PFSM"), and manual override manual ("MOM"), shown in top view (9-A), partial cross-sectional view (9-B), partial bottom view (9-C), and side view (with partial cross-sectionals) (9-D);

FIG. 10 is a detail view of the PRM of FIG. 9, shown in partially cut-away top view (with partial cross-sectionals) (10-A), partial cross-sectional view (10-B), and partial bottom view (10-C);

FIG. 12 is a detail view of the DM of FIG. 9, shown in partially cut-away top view (12-A), partial cross-sectional view (12-B), and bottom view (12-C);

FIG. 13 is a detail view of the LSM of FIG. 9, shown in partially cut-away top view (13-A), partial cross-sectional view (13-B), and bottom view (13-C);

FIG. 14 is a detail view of the PFSM and MOM of FIG. 9, shown in partially cut-away top view (with partial cross-sectionals) (14-A), partial cross-sectional view (14-B), and partial bottom view (14-C);

FIG. 17 is a electronic control module for remote operation of the PCM and PSM, shown in top view (with cover removed) (17-A) and side view (17-B);

FIG. 18 is a standard DO5 valve pattern;

FIG. 19 is a standard DO8 valve pattern; and

FIG. 20 is a chart of relationships between various standard mounting patterns from various standard-setting bodies.

DETAILED DESCRIPTION OF THE INVENTION

Prior Art

Figure 5:
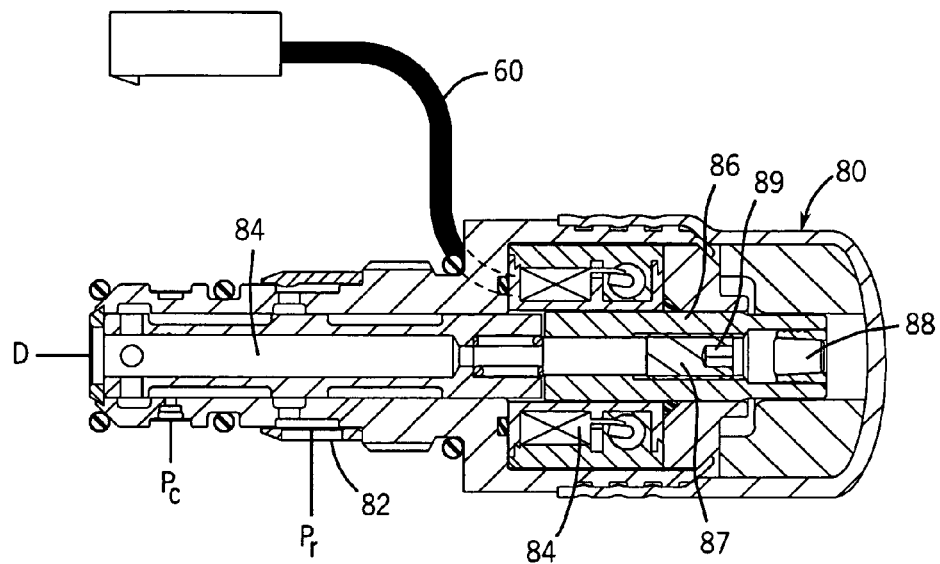
FIG. 5 is a detail view of a pilot control valve assembly ("PCVA") of FIG. 4, shown in cross-sectional view.

Referring now to FIG. 1, a prior art apparatus 10 is shown comprising a valve housing 12 in physical and electrical contact with a junction box 14 having one or more passages for wire conduit 15 at distal ends thereof. A longitudinal bore 16 extends about a longitudinal axis L—L of the valve housing 12, into which a sliding spool 18 is precision-fit The sliding spool 18 contains one or more lands 20 that divide the longitudinal bore 16 into one or more chambers 22. Alternatively, it can also be directly machined into the valve housing 12 without a cartridge design, as well-known in the art. Regardless, through operation and positioning of the sliding spool 18, the one or more chambers 22 can be made to align with a pressure port P, one or more tank ports T, and one or more working ports A, B, as well-known in the art. While the pressure port P connects to a pressure flow source (not shown), the two working ports A, B connect to one or more actuating units (not shown). Thus, looking generally left to right along the longitudinal axis L—L in FIG. 1-B, the five chambers are T, A, P, B, and T, whereby the first and last tank ports T are connected through a well-known tank core passage 24. As well-known in the art, the tank core passage 24 extends through a vertical plane V defined by the longitudinal axis L—L extending through the longitudinal bore 16 of the valve housing 12 and a vertical cross-section extending through the valve housing 12.

The pressure port P, one or more tank ports T, and one or more working ports A, B communicate with one another through the one or more chambers 22 of the longitudinal bore 16, whereby the position of the one or more lands 20 of the sliding spool 18 determines which of the four ports P, T, A, and B are open and closed relative to one another. As the one or more lands 20 of the sliding spool 18 line up with different combinations of the one or more chambers 22 of the longitudinal bore 16, fluid flow is thereby directed through the four ports P, T, A, and B of the valve housing 12.

More specifically, the porting arrangements are defined as follows: P is a system pressure port that defines a passage for connecting system pressure to a hydraulic pump. T is a tank pressure port that defines a passage for connecting a reservoir to the hydraulic pump. A is an extension load pressure port that defines a passage for connecting the valve to one or more external work-pieces. B is a retraction load pressure port that defines a passage for connecting the valve to the one or more external work-pieces. L is an optional load sense pressure port that defines a passage for sensing the highest pressure between the extension load pressure port A and retraction load pressure port B through an optional load sense module ("LSM"). D is an optional drain pressure port that defines a passage for draining a pilot controlled module ("PCM") directly to a reservoir in the hydraulic circuit whenever pressure at the tank pressure port T exceeds pressure at the drain pressure port D. Pr is an optional regulated pressure port that defines a passage for connecting the valve to an optional internal or external pressure reducing module ("PRM") for proportional and servo operation.

Actuating the sliding spool 18 occurs by energizing one or more high power solenoids 26 that flank distal ends of the valve housing 12. Alternatively, the one or more high power solenoids 26 can also be located internally within the valve housing 12. Regardless, the one or more high power solenoids 26 are energized by electrical current carried by one or more electrical leads 28 that extended through one or more passages 30 of the valve housing 12 and into the junction box 14. The one or more electrical leads 28 are connected to a remote power source (not shown). Because of the high current typically required to energize the one or more high power solenoids 26 and actuate the sliding spool 18, the one or more electrical leads 28 are commonly made of a heavy gauge wire (e.g., 10–14 gauge) and the power source must be physically remote from the prior art apparatus 10. When one or more of the high power solenoids 26 are energized, one or more push rods 32 are forced against the ends of the sliding spool 18 causing motion thereof, whereby the sliding spool 18 shifts away from the one or more pushrods 32 and towards an opposite end of the longitudinal bore 16 along the longitudinal axis L—L. When one or more of the high power solenoids 26 are de-energized, one or more centering springs 34 bias the sliding spool 18 back to a non-biased or original position thereof. Positioning the sliding spool 18 can also be accomplished by other manual, mechanical, electrical, magnetic, hydraulic, and pneumatic techniques, as well as by various combinations thereof. For example, one or more manual overrides 36 are commonly connected to the one or more high power solenoids 26 to enable manually positioning or repositioning the sliding spool 18 within the valve housing 12.

Consistent with well-known industry standards, a bottom surface 38 of the valve housing 12 contains four passages extending therethrough for alignment and communication with the four ports P, T, A, and B. O-ring sealing about the passages is common for preventing leakage. The bottom surface 38 can also optionally contain a load sense port L, drain port D, pressure port Pr, and four mounting holes 40 for securing a sub-plate (not shown) to the valve housing 12 by techniques well-known in the art. Because the bottom surface 38 can be geometrically symmetrical, an optional locating pin 42 can be commonly provided for alignment purposes. The bottom surface 38 complies with current mounting patterns of the National Fluid Power Association and ("NFPA"), Joint Industrial Council ("JIC"), Comité Européen des Transmissions Oléohydrauliques et Pneumatiques ("CETOP"), and International Organization for Standardization ("ISO"), and is suitable for both sub-plate and bar manifold mounting. Hereinout, this generalized arrangement is referred to as a standard mounting pattern 44, with FIGS. 1-C, 2-C, 3-C, 4-C, 9-C, 10-C, 13-C, 14-C showing a standard DO8 valve pattern, FIG. 18 showing a standard DO5 valve pattern, FIG. 19 showing a standard DO8 valve pattern, and FIG. 20 showing a chart of relationshins between various standard mounting patterns from various standard-setting bodies.

Referring now to FIGS. 2–16, the present invention is described, for ease of reference, with reference to two representative, non-exhaustive, and non-mutually exclusive embodiments.

First Preferred Embodiment

FIGS. 2–8 generally disclose a first preferred embodiment of the present invention.

Referring now to FIG. 2, a modular apparatus 50 is shown comprising four primary modules, including a valve base module ("VBM") 52, pilot control module ("PCM") 54, thermal insulating module ("TIM") 56, and power source module ("PSM") 58. The PSM 58 is in physical contact with the TIM 56. The TIM 56 is in physical contact with, and preferably disposed between, the PSM 58 and PCM 54. The PCM 54 is in physical contact with, and preferably disposed between, the TIM 56 and VBM 52. The VBM 52 is in physical contact with the PCM 54. And preferably, the PSM 58 is disposed above the TIM 56, which is disposed above the PCM 54, which is disposed above the VBM 52 relative to a vertical plane V defined by the longitudinal axis L—L extending through the longitudinal bore 16 of the valve housing 12 and a vertical cross-section extending through the valve housing 12. Furthermore, the PCM 54 is in electrical contact with the PSM 58 through one or more electrical leads 60 that extended through one or more passages 62 in the TIM 56. Otherwise, the TIM 56 thermally isolates the PSM 58 from the PCM 54 and VBM 52. Other relationships between the VBM 52, PCM 54, TIM 56, and PSM 58 will be discussed hereinout.

Referring now to FIG. 3, the VBM 52 is shown. More specifically, the VBM 52 contains, similar to the prior art apparatus 10 of FIG. 1, a valve housing 12, longitudinal bore 16, sliding spool 18, one or more lands 20, one or more chambers 22, a pressure port P, one or more tank ports T, one or more working ports A, B, one or more centering springs 34, and a bottom surface 38. Actuating the sliding spool 18 does not occur by energizing one or more solenoids 26, but instead by operation of the PCM 54, as will be elaborated upon. Without the one or more high power solenoids 26 to hold the one or more centering springs 34 in place, one or more spring retaining surfaces 35 preferably perform this function, and one or more end caps 37 are attached at distal ends of the valve housing 12.

Also similar to the prior art apparatus 10 of FIG. 1, looking generally left to right along the longitudinal axis L—L in FIG. 3-B, the five chambers are T, A, P, B, and T, whereby the first and last tank ports T are connected through a tank core passage 24'. However, the new tank core passage 24' of the modular apparatus 50 no longer extends through the vertical plane V defined by the longitudinal axis L—L extending through the longitudinal bore 16 of the valve housing 12 and a vertical cross-section extending through the valve housing 12 (as shown, for reference purposes only, as dashed lines in the vertical plane V). Rather, the new tank core passage 24' preferably extends through a horizontal plane H defined by the longitudinal axis L—L extending through the longitudinal bore 16 of the valve housing 12 and a horizontal cross-section extending through the valve housing 12.

It should be recognized, of course, that the horizontal plane H, as depicted, could also be rotated 180° about the longitudinal axis L—L in order to be aligned with the position of the new tank core passage 24' that is shown in FIG. 3-A, but for ease of representation purposes, this has not been done. In other words, the foregoing recognizes and contemplates that the horizontal plane H extends, obviously, through the longitudinal axis L—L and is otherwise infinite in expanse.

More generally, the new tank core passage 24' can extend through any non-vertical plane P (not shown) defined by the longitudinal axis L—L extending through the longitudinal bore 16 of the valve housing 12 and a non-vertical cross-section extending through the valve housing 12, the horizontal plane H being but one representative example thereof. In other words, while the new tank core passage 24' has been offset from the vertical plane V, it can be located in any non-vertical plane P. Accordingly, any non-vertical plane P offset angle a satisfying the following relative to the vertical plane V can be used: $0 < \alpha < 360$.

Relative re-positioning of the new tank core passage 24' away from the vertical plane V permits the pressure port P and two working ports A, B (as well as the optional drain pressure port D and optional regulated pressure port Pr) to extend from the bottom surface 38 to a top surface 72 of the VBM 52, thereby creating an extended pressure port P' and two extended working ports A', B' (as well as an optional drain pressure port D' and optional regulated pressure port Pr') now having physical access to the top surface 72 and the PCM 54. Thus, in a preferred embodiment of the foregoing, the new tank core passage 24' is offset from the vertical plane V to a sufficient degree to permit the extended pressure port P' and two extended working ports A', B' (as well as the optional drain pressure port D' and optional regulated pressure port Pr') to extend to the top surface 72 of the valve housing 12, which thereby permits other modules to be mounted on top of the VBM 52, as will be elaborated upon.

To support mounting other modules on top of the VBM 52, a first interfacing chamber ("FIC") 76 and second interfacing chamber ("SIC") 78 are defined within the valve housing 12 of the VBM 52 of the modular apparatus 50 at distal ends thereof along the longitudinal axis L—L at terminal ends of the spool 18. The FIC 76 and SIC 78 are control chamber pressure ports that defines a passage for shifting the sliding spool 18. Communicatively connected to the FIC 76 is a first interfacing passageway ("FIP") 77 extending therefrom to and through the top surface 72 of the VBM 52. Likewise, communicatively connected to the SIC 78 is a second interfacing passageway ("SIP") 79 extending therefrom to and through the top surface 72 of the VBM 52. Each of the FIP 77 and SIP 79 form control pressure ports Pc, as will be elaborated upon. In any event, the FIP 77, SIP 79, extended pressure port P', and two extended working ports A', B' (as well as the optional drain pressure port D' and optional regulated pressure port Pr') are thus provided fluid access to the other modules to be mounted on top of the VBM 52, such as the PCM 54. More specifically, for example, the FIP 77, SIP 79, extended pressure port P', and two extended working ports A', B' (as well as the optional drain pressure port D' and optional regulated pressure port Pr') are provided fluid access to the PCM 54, whereby, for example, the FIC 76 and SIC 78 are energized by one or more solenoids of the PCM 54. On the other side, the bottom surface 38 of the valve housing 12 maintains the standard mounting pattern 44.

Furthermore, while a representative four-way directional control valve is represented in the VBM 52 for illustrative purposes, neither the modular apparatus 50 nor VBM 52 are limited in this regard. Rather, the following are also hereby contemplated: flow control, pressure control, and directional control valves; two-way, three-way, and four-way valves; on-off valves and proportional valves; servo valves; and so on, by other techniques well-known in the art.

Referring now to FIG. 4, the PCM 54 is shown. More specifically, the PCM 54 contains one or more electrical leads 60 for electrical connection to the PSM 58 by techniques well-known in the art. Also, by techniques well-known in the art, the PCM 54 controls operation of the VBM 52 through its fluid contact therewith. To this end, the PCM 54 includes one or more pilot control valve assemblies ("PCVA") 80 for interfacing with the VBM 52, as will be elaborated upon.

The PCM 54 has a top surface 90 and a bottom surface 92, the bottom surface 92 having physical access to and alignment with the top surface 72 of the VBM 52 through the standard mounting pattern 44. More specifically, for example, the extended pressure port P' and two extended working ports A', B' (as well as the optional drain pressure port D' and optional regulated pressure port Pr') are provided fluid access from the bottom surface 92 of the PCM 54 to the top surface 90 of the PCM 54 for fluid communication with other modules to be mounted on top of the PCM 54, as will be elaborated upon. Likewise, the FIP 77 and SIP 79 are also provided fluid access from the bottom surface 92 of the PCM 54 to the one or more PCVAs 80. In addition, the top surface 90 of the PCM 54 preferably has one or more passages 94 for mating alignment with the one or more passages 62 in the TIM 56, as shown in FIG. 7.

Referring now to FIG. 5, a preferred PCVA 80 is shown, comprising a cartridge body 82 that contains the optional drain pressure port D, optional regulated pressure port Pr, and a control pressure port Pc, and houses a PCVA sliding spool 84, PCVA coil 86, PCVA null adjustment spring 87, PCVA null adjustment screw 88, and PCVA pole piece 89. In operation, when a pulse width modulation ("PWM") signal is applied to the PCVA coil 86, it preferably creates a magnetic force at 75 Hertz, which modulates the PCVA sliding spool 84, thereby metering flow into and out of the cartridge body 82 via the drain pressure port D, regulated pressure port Pr, and control pressure port Pc. As will be elaborated upon, by regulating the on time and off time to the PCVA coil 86, the pressure in the control pressure port Pc can be controlled in accordance with the graph shown in FIG. 6.

A representative PCVA 80 is available from Parker Hannifin Corporation of Cleveland, Ohio, Part Number VS 1515-3011, as well as other commercially-available, suitable products. This is commonly known in the industry as a three-way device, in which it is also commonly known various combinations of voltages and currents can be achieved by changing the coil resistance of the PCVA 80.

The representative PCVA 80 is a low resistance (i.e., 12 Ohms at 70° F.), low power device, requiring, for example, 1 amp excitation at 12 volts DC for on-off operation (100–3000 psi), and PWM at a frequency of 75 Hertz for proportional and servo operation (100–1000 psi). This representative PCVA 80 preferably has an operating temperature range of −40° F. to +250° F., a viscosity range of 30–3000 SUS, and is rated at 12 volts DC. This representative PCVA 80 is a time-dependent, full voltage or full current, on-off device, capable of on-off, proportional, and servo operations.

With on-off operation, the PCVA coil 86 is electrically energized with either high or low (i.e., full or zero) voltage or current, such as 12 volts DC or 0 volts DC from the PSM 58. When the PCVA coil 86 is subjected to the high voltage (i.e., 12 volts DC) or current, then the PCVA sliding spool 84 directs flow from the regulated pressure port Pr to the control pressure port Pc, blocking the drain pressure port D, which, in turn, feeds control pressure from the control pressure port Pc to the FIC 76 through the FIP 77 to the VBM 52. This pressure thus acts against a sliding spool 18 to create sufficient force to overcome the preloaded force created by a centering spring 34 at a distal end thereof. In turn, the transfer of the high voltage or current signal to the PCVA 80 through the PSM 58 controls positioning of the PCVA sliding spool 84 in the longitudinal bore 16 of the VBM 52 to achieve a position relative to the one or more chambers 22 of the VBM 52.

When there is a lack of voltage or current to the PCVA coil 86, the PCVA sliding spool 84 achieves its original position due to the preloaded PCVA null adjustment spring 87, where the regulated pressure port Pr is blocked, and the control pressure port Pc connects to the drain pressure port D, which drains the FIP 77 through the FIC 76 of the VBM 52. This pressure thus acts against the sliding spool 18 to return it to its original position created by the centering spring 34 at a distal end thereof. In turn, the transfer of the low voltage or current signal to the PCVA 80 through the PSM 58 controls positioning of the PCVA sliding spool 84 in the longitudinal bore 16 of the VBM 52 to achieve its center, or commonly known as neutral, position relative to the one or more chambers 22 of the VBM 52.

Accordingly, the VBM 52 is controlled through the PSM 58 operating in conjunction with the PCM 54, and this description applies equally to both of the working ports A, B, with one of the PCVA 80 controlling the former and the other PCVA 80 controlling the latter.

Figure 6:
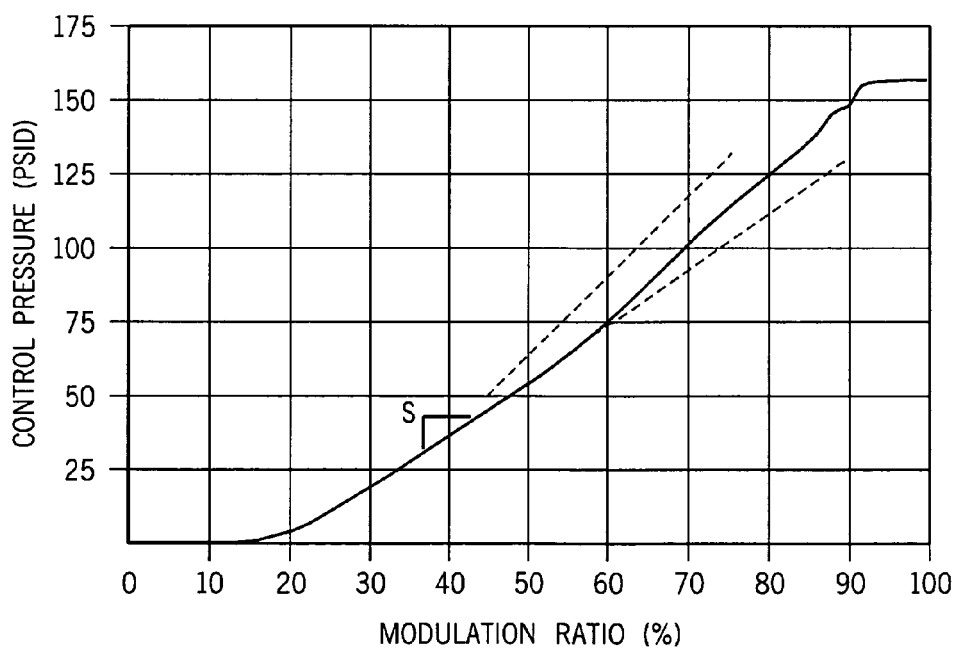
FIG. 6 is a graph of modulation ratio verses control pressure of the PCVA of FIG. 5.

With proportional operation, the pressure in the control port Pc can be controlled by changing the base of on time versus off time. More specifically, the pressure at the control port Pc can be controlled in accordance with the graph shown in FIG. 6, in which case the x-axis depicts the modulation ratio, defined by the proportion of on time to off time (expressed as a ratio), and the y-axis depicts the pressure in the control port Pc (expressed in psid). For example, at a modulation ratio of approximately 48%, the control pressure is approximately 50 psid. By techniques well-known in the art, many changes can be made thereto, including, for example, modifying the slope S of the curve as desired. In any event, with proportional control, the on time and off time to the PCVA coil 86 is regulated. More specifically, the pressure in the control port Pc feeds control pressure from the control port Pc to the FIC 76 through the FIP 77 to the VBM 52. This pressure thus acts against the sliding spool 18 to create sufficient force to overcome the preloaded force created by a centering spring 34 at a distal end thereof. Once the forces are equal, or substantially equal, then the sliding spool 18 in the longitudinal bore 16 of the VBM 52 achieves a position relative to the one or more chambers 22 of the VBM 52. This position is now controlled by the time base changes applied to the PCVA 80, preferably as shown in FIG. 6. Accordingly, the VBM 52 is controlled through the PSM 58 operating in conjunction with the PCM 54, and this description applies equally to both of the working ports A, B, with one of the PCVA 80 controlling the former and the other PCVA 80 controlling the latter.

Finally, with servo operation, proportional control can be corrected or further adjusted, as desired. More specifically, the same PCVAs 80 can accomplish on-off, proportional, and servo operations. With the prior art apparatus 10, on the other hand, different high power solenoids 26 had to be changed to accomplish the different types of operation. But with the preferred modular apparatus 50, the PCVAs 80 control positioning of the sliding spool 18 in the longitudinal bore 16 of the VBM 52 to achieve a position relative to the one or more chambers 22 of the VBM 52. Attaching the position feedback sensor module ("PFSM") 126 to the sliding spool controls positioning thereof in the longitudinal bore 16 of the VBM 52 to achieve a position relative to the one or more chambers of the VBM 52. More specifically, an electrical signal is sent to the PCVA 80 of the PCM 54 through the PSM 58 to control the position of the sliding spool 18 of the VBM 52, wherein the PFSM 126 transmits an electrical feedback signal in electrical voltage or current, relative to the positioning of the spool 18 to the one or more chambers 22 of the VBM 52. The PSM 58 compares the electrical feedback signal from the PFSM 126 against the electrical input signal supplied to the PSM 58 by techniques well known in the art. Any differences therein are then corrected for, or otherwise adjusted by, controlling the VBM 52 through the PSM 58 operating in conjunction with the PCM 54.

Thus, as previously mentioned, the PCVAs 80, acting through the PSM 58 operating in conjunction with the PCM 54, achieve i) on-off flow control, ii) proportional flow control, and iii) servo flow control. Accordingly, the modular apparatus 50 enables additional modules to be placed on top of the VBM 52.

Pragmatically, on-off devices are generally less expensive than proportional devices since land location tolerances for the former are less critical than they are with the latter. In any event, in-line pilot filtration can also be added if desired, by techniques known in the art, to the PCM 54 in order to protect it from internal and external fluid contamination.

Referring now to FIG. 7, the TIM 56 is shown. More specifically, the TIM 56 comprises one or more passages 62 extending therethrough for allowing passage of the one or more electrical leads 60 therethrough. A preferred TIM 56 comprises thermal tape available from 3M of Maplewood, Minn., a suitable silicone-coated glass, or a thermal gasket available from Dupont of Wilmington, Del., comprising, for example 86% Nomex® and 14% Kevlar®, as well as other commercially-available, suitable thermally insulating barriers designed to shield the PSM 58 from the PCM 58. For example, one preferable TIM 56 can withstand +480° F. on the side exposed to the top surface 90 of the PCM 54, and ambient temperature on the side exposed to the bottom surface 110 of the PSM 58. In any event, an appropriate thickness and insulating properties are chosen for the TIM 56 to achieve the desired thermal insulation over a desired temperature range (e.g., −40° F. to +250° F.). It protects the PSM 58 from the temperatures created about the PCM 54 and VBM 52.

In an alternative embodiment, the PCM 54 and PSM 58 are connected remotely from the VBM 52, which diminishes or eliminates the need for the TIM 56, as elaborated upon in conjunction with FIG. 17.

Referring now to FIG. 8, the PSM 58 is shown. More specifically, the PSM 58 comprises a power supply or PWM circuit board 100 encased in a housing 102 attached to a cover plate 104 by one or more attachment fasteners 105. In a preferred embodiment, one distal end of the PSM 58 contains a Hirschmann connector 106, while the other distal end contains a Brad Harrison connector 108. For example, a representative three-pin Hirschmann connector 106 is available from the Hirschmann Corporation of Pine Brook, N.J., Part Number GDM-3014J, in which Pin 1 is connected to a line signal, Pin 2 is connected to neutral, and Pin 3 is connected to ground, all by techniques known in the art, and which establish the input voltage for the PSM 58. Similarly, a representative four-pin Brad Harrison connector 108 is also available from the Brad Harrison Corporation of Northbrook, Ill., Part Number 1R400A20A120, in which Pin 1 is connected to 12 volts DC, Pin 2 is connected to common, Pin 3 is connected to a first enable signal, and Pin 4 is connected to a second enable signal, all by techniques known in the art, and which establish the control voltage for the PSM 58. An alternative, representative eight-pin Brad Harrison connector 108 is also available from the Brad Harrison Corporation of Northbrook, Ill., Part Number 2R8004A20A120, in which Pin 1 is connected to 5 volts DC, Pin 2 is connected to common, Pin 3 is connected to a first analog signal, Pin 4 is connected to second analog signal, Pin 5 is connected to a first enable signal, Pin 6 is connected to a second enable signal, Pin 7 is connected to an RS232 transmit port, and Pin 8 is connected to an RS232 receive port, all by techniques known in the art, and which again establish the control voltage for the PSM 58. Other commercially-available, suitable connectors can also be used instead of the Hirschmann connector 106 and Brad Harrison connector 108. In addition, a bottom surface 110 of the PSM 58 also preferably has one or more passages 112 for mating alignment with the one or more passages 62 in the TIM 56.

A representative power supply or PWM circuit board 100 of the PSM 58 is available from GS Hydraulics, Inc. of New Berlin, Wis., Part Number GS-99279, which is a dual channel PWM printed circuit board for controlling hydraulic proportional valve, characterized by one or more of the following preferred parameters: PWM capabilities, 75 Hertz modulation frequency, high-side current sourcing, maximum amperage of 1 amp, circuit protection via over and open circuit paths, 0–5 volts DC analog inputs, ramp controlled acceleration and deceleration for the PCVA solenoids 84, +9 to +30 volts DC input range, reverse polarity to −600 volts, operating temperature range of −40° F., to +158° F., and transient clamping above 36° F.

In a preferred embodiment, the power supply or PWM circuit board 100 is capable of at least the following functionality: i) DC to DC power supply conversion, ii) AC to DC power supply conversion, iii) PWM operation for proportional circuit control, and iv) PWM operation for servo operation circuit control. For example, the DC to DC power supply preferably converts a 12–48 volts DC input to a 12 volts DC output at 1 amp to drive the PCVA solenoids 84. The AC to DC power supply preferably converts a 120–240 volts AC input to a 12 volts DC output at 1 amp to drive the PCVA solenoids 84 at 50–60 Hertz, thereby accommodating all standardized voltages and frequencies used throughout the world. Thus, whereas the prior art apparatus 10 required changing the one or more high power solenoids 26 for different input voltages and frequencies, the modular apparatus 50 enables standardization. Among other things, this standardization reduces manufacturing costs, allows efficiencies to be derived from common hardware, decreases inventories of additional coils, and facilitates easier field support and changes. In addition, the PWM operation for the PSM 58 is substantially similar for on-off control, proportional control, and servo control, as previously elaborated upon.

Whereas the prior art apparatus 10 required attaching one or more high power solenoids 26 to the sliding spool 18, the preferred PSM 58 is a low-power device. More specifically, the one or more high power solenoids 26 required relatively high forces to act, and overcome, the flow forces generated during activation of the prior art apparatus 10, which, in turn, required relatively high current levels to generate sufficient forces. The modular apparatus 50, on the other hand, acting through the PCM 54 and PSM 58, has eliminated the need for one or more high power solenoids 26. In particular, the PCM 54 preferably utilizes hydraulic or pneumatic amplification, instead of electromagnetic forces, to generate opposing forces to act, and overcome, the flow forces generated during activation of the modular apparatus 50, which, in turn, requires relatively low current levels to generate sufficient forces.

Because of the decreased power requirements, the modular apparatus 50 can be operated in an intrinsically safe mode, and is thereby capable of use in hazardous environments. In addition, unlike with the prior art apparatus 10, low power cabling can be used with the modular apparatus 50. Furthermore, the low current application also allows incorporating one or more light-emitting diodes ("LEDs") (not shown) to the coil of the modular apparatus 50 to depict coil energization and de-energization, whereas the prior art apparatus 10 required high powered and expensive lightings for diagnosing, for example, the status of electromagnetic coils.

As previously mentioned, the PSM 58 is, preferably, thermally isolated from the PCM 54 by the TIM 56. Alternatively, the PSM 58 can also be thermally isolated from the PCM 54 by locating the two physically remote from one another. In other words, the PSM 58 is, in one embodiment, located remotely from the modular apparatus 50, thereby eliminating the need for the TIM 56, as will be elaborated upon.

In addition, a preferred PSM 58 contains a microprocessor, allowing much of the functionality thereof to be controlled by software protocols. For example, surface mounting electronic components can be additionally incorporated onto a driver board to decrease cost, space requirements, and enable higher temperature operation. Moreover, the microprocessor allows changing the functionality of the modular apparatus 50 by changing software system gain components instead of hardware. In addition, a suitable microprocessor device, as understood by one skilled in the art, enables monitoring or control of the modular apparatus 50 through a remote computer operator, acting, for example, through the a personal computer, modem, or the Internet.

Second Preferred Embodiment

FIGS. 9–14 generally disclose a second preferred embodiment of the present invention.

In addition, a preferred PSM 58 contains a microprocessor, allowing much of the functionality thereof to be controlled by software protocols. For example, surface mounting electronic components can be additionally incorporated onto a driver board to decrease cost, space requirements, and enable higher temperature operation. Moreover, the microprocessor allows changing the functionality of the modular apparatus 50 by changing software system gain components instead of hardware. In addition, a suitable microprocessor device, as understood by one skilled in the art, enables monitoring or control of the modular apparatus 50 through a remote computer operator, acting, for example, through the a personal computer, modem, or the Internet.

Referring still to FIG. 9, in which all of the nine modules are simultaneously present, the PRM 120 is in physical contact with, and preferably disposed between, the VBM 52 and LSM 124. The DM 122 is in physical contact with, and preferably disposed between, the PCM 54 and TIM 56. The LSM 124 is in physical contact with, and preferably disposed between, the PRM 120 and PCM 54. And the PFSM 126 and MOM 128 preferably flank opposite distal ends of the VBM 52.

Functionally, the DM 122 facilitates diagnostic troubleshooting and other engineering evaluation of the modular apparatus 50'. The LSM 124 senses the highest load pressure between the two working ports A, B and connects the appropriate port to the load sense port L. The PFSM 126 provides position, pressure, flow, velocity, speed, torque, temperature, or other types of feedback to enable the modular apparatus 50' to operate as a servo system. And the MOM 128 allows manually controlling the positioning of the sliding spool 18 if necessary.

Preferably, the electrical components between each module can plug into one another without disassembling any of the hydraulics, pneumatics, or other electrical connections. This, in turn, minimizes assembly, testing, diagnostic trouble shooting, and the like, both at the point of assembly, as well as field testing and servicing.

Referring now to FIG. 10, the PRM 120 is shown. More specifically, the PRM 120 contains a bottom surface 130 for interfacing with the VBM 52 through the standard mounting pattern 44 and a top surface 132 for interfacing with the PCM 54 or the LSM 124 if the LSM 124 is included. Preferably, the PRM 120 also contains a pressure reducing valve cartridge ("PRVC") 134 at one distal end thereof, and a well-known SAB plug 136 at the other distal end thereof. If, on the other hand, the PCVA 80 is rated for, say, up to 5000 psi, the PRM 120 can be avoided if the modular apparatus 50' is not exposed to such pressures. In any event, the PRM 120 regulates pressure to the PCM 54, which, in turn, coordinates supplying regulated pressure to the VBM 52.

Figure 11:
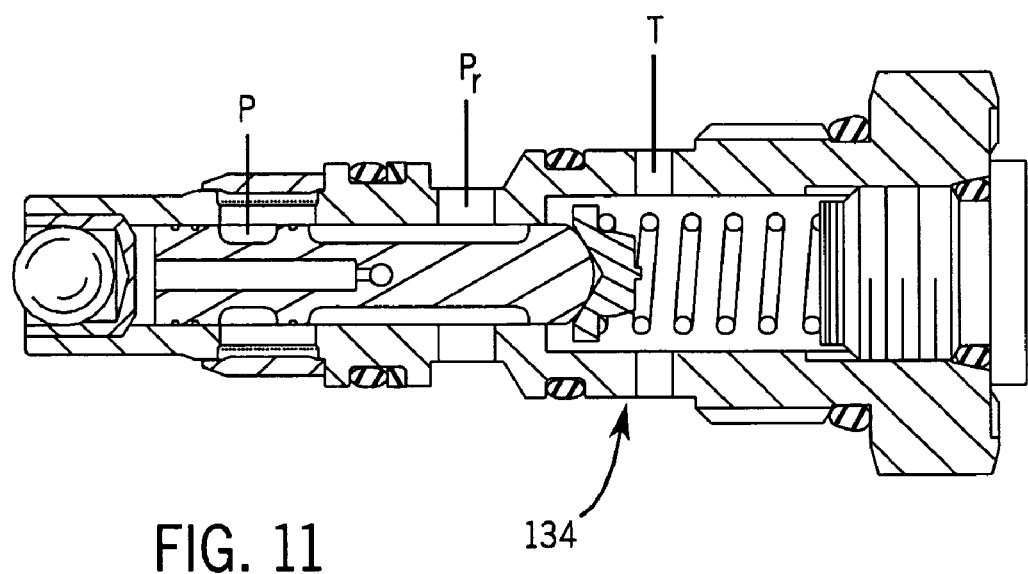
FIG. 11 is a detail view of the pressure reducing valve cartridge ("PRVC") of FIG. 10, shown in cross-sectional view.

Referring now to FIG. 11, a preferred PRVC 134 for the PRM 120 is shown. More specifically, the PRVC 134 contains a system pressure port, a pilot pressure port, and a tank port. A representative PRVC 134 is available as an industry standard, either in cartridge form, as shown, or in other equally well-known forms, such as slip-in-designs, built-in machined designs, and the like.

Referring now to FIG. 12, the DM 122 is shown. More specifically, the DM 122 contains a pressure transducer 140 external to a body 142 of the DM 122. Within the body 142 of the DM 122, the pressure transducer 140 is in communication with a shuttle valve assembly ("SVA") 144 that operates between the two working ports A, B. The SVA 144 is further connected to a SAE plug 146. In operation, the highest load pressure will connect either of the two working ports A, B to the pressure transducer 140. Accordingly, appropriate data can be provided to a computing device to calculate, for example, cycle timing for the modular system apparatus 50'. In any event, the DM 122 communicates functional data about the modular apparatus 50', including, for example, data regarding load pressures, load flows, load fluid temperatures, and the like. Preferably, transducers built into the DM 122 relay the functional data to hand-held or remotely located receiving devices (not shown), preferably through a conventional RS-232 port or the like.

A representative pressure transducer 140 is available as an industry standard, and a representative SVA 144 is available from Parker Hannifin Corporation of Cleveland, Ohio, Part Number 75143-01, as well as other commercially-available, suitable products.

Referring now to FIG. 13, the LSM 124 is shown. More specifically, the LSM 124 contains another shuttle valve assembly ("SVA") 150 within a body 152 of the LSM 124. The SVA 150 is further connected to another SAE plug 154. The LSM 124 also contains a bottom surface 156 for interfacing with the VBM 52 or PRM 120 if the PRM 120 is included through the standard mounting pattern 44.

In operation, the LSM 124 senses the highest load pressure between the two working ports A, B. More specifically, by shifting the SVA 150 due to high pressure, the LSM 124 connects the appropriate port to the load sense port L. Accordingly, the load pressure is directed to the load sense port L using a variable volume sense pump or load sense valve (not shown). In turn, this permits the main flow to adjust to the required load pressure for the modular apparatus 50', and decreases overall energy usage, noise, and heat generated by the same. In any event, the LSM 124 senses the highest load pressure between the working ports A, B of the VBM 52, and internally feeds the highest load pressure to the variable volume sense pump, which, in turn, reacts to that highest load pressure between the working ports A, B.

A representative SVA 150 is available from Parker Hannifin Corporation of Cleveland, Ohio, Part Number 75143-01, as well as other commercially-available, suitable products.

Referring now to FIG. 14, the PFSM 126 and MOM 128 are shown.

More specifically, the PFSM 126 is preferably connected directly to the sliding spool 18 of the VBM 52 in order to be able to detect the position of the sliding spool 18. Preferably, the PFSM 126 is a threaded, attached plate module with an electromagnetic, Hall Effect, or other type of transducer, which can provide position, pressure, flow, velocity, speed, torque, temperature, or other types of feedback. In this fashion, the PFSM 126 allows the modular apparatus 50' to operate as a servo system. It senses the position of the sliding spool 18 in the VBM 52, and then provides data regarding that position through a voltage or current signal provided to the PSM 58, where, for example, a comparator can increase or decrease, as appropriate, the voltage or current to the PCM 54 in order to position or reposition the sliding spool 18 within the longitudinal bore 16 of the VBM 52 to a desired position.

A PFSM 126, for example, changes either output voltage or output current relative to the position of the armature that is attached to the sliding spool 18. By ascertaining the positioning of the sliding spool 18, the input signal can be electronically compared to the direct control valve to achieve a desired position for the sliding spool 18. If a desired position for the sliding spool 18 is not obtained, an error signal is sent via the PFSM 126 to apply more or less digital PWM signaling as appropriate, until the desired position is obtained, which is generally zero error on the power supply amplifier. In this fashion, the PFSM 126 allows the modular apparatus 50' to operate as a servo system, providing feedback unto the VBM 52 in order to achieve desired positioning for the sliding spool 18 thereof. A representative PFSM 126 is available from Schaevitz Sensors, a division of Measurement Specialties Incorporated, of Hampton, Va., as well as other commercially-available, suitable products.

Likewise, the MOM 128 is also preferably connected directly to the sliding spool 18 of the VBM 52 in order to be able to manually control the positioning of the sliding spool 18 in the event of a coil burn-out, wire fretting, wire cutting, pilot control contamination, or the like, related to the electrical signals from the PCM 54 and PSM 58. Preferably, the MOM 128 is a threaded, attached plate module with override options including mechanical hand lever operation, manual push-pull operation, cable linkage push-pull operation, remote operation, hydraulic operation, pneumatic operation, and the like, all of which permit manual operation of the VBM 52. Regardless, locating the PCM 54 and PSM 58 above the VBM 52 permits direct linking to the sliding spool 18 of the VBM 52 for manual operation, whereas in the prior art apparatus 10, manual override devices had to be connected to the armature of the one or more high power solenoids 26 instead of directly to the sliding spool 18. In any event, the MOM 128 permits manual control of the VBM 52 in case, for example, there is a sudden or unexpected lack of input power to the PCM 54.

Mounting

Figure 15:
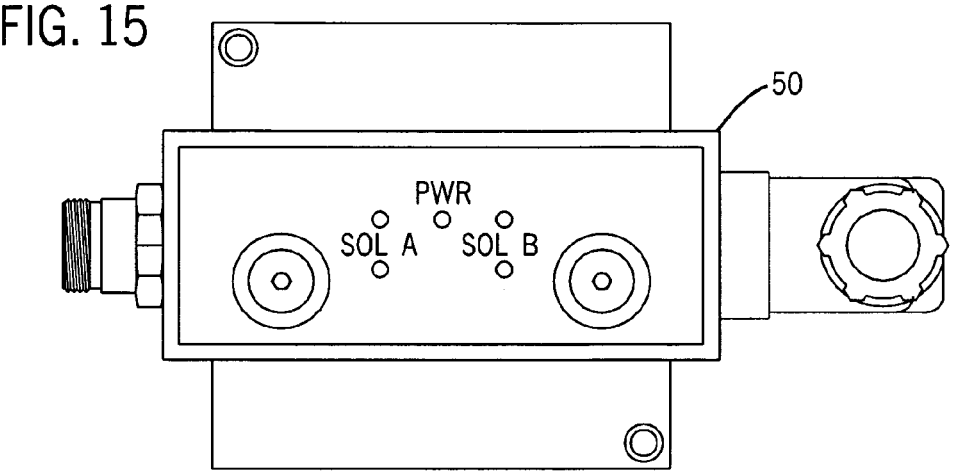
FIG. 15 is a modular control valve system according to the present invention, including sub-plate mounting, shown in top view.
Figure 16:
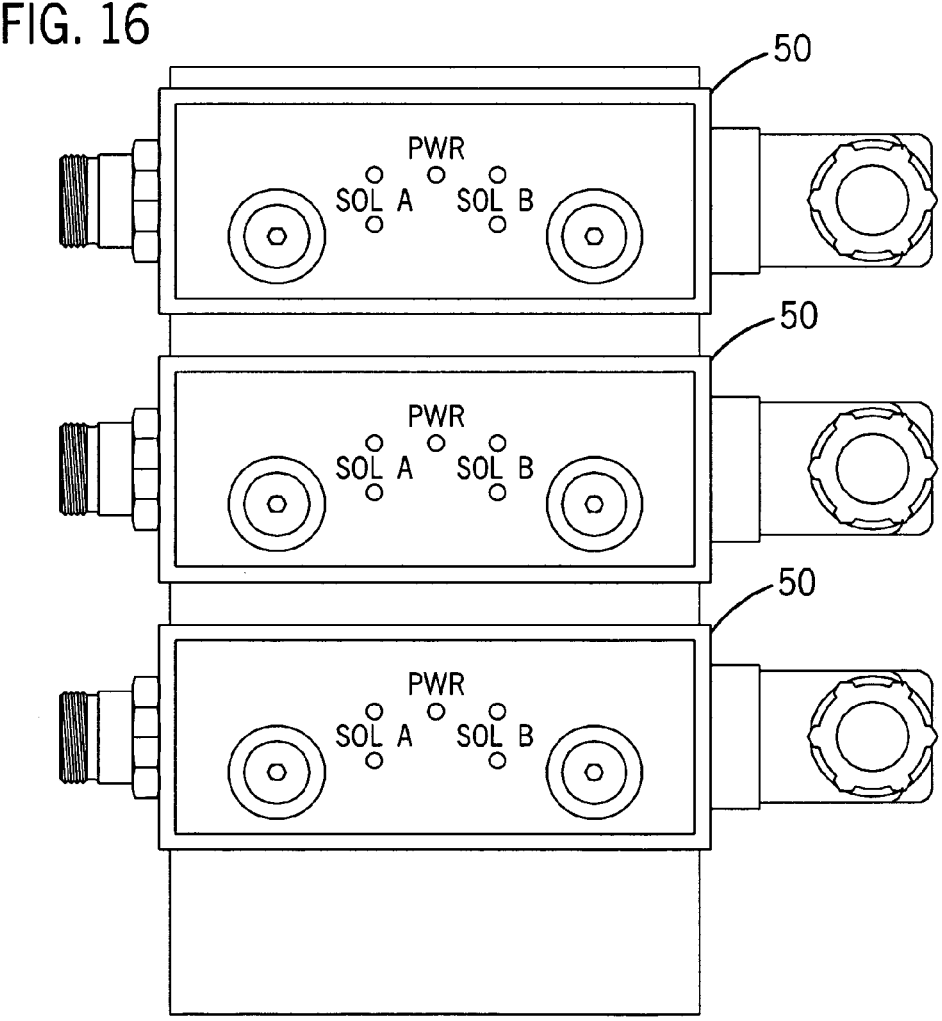
FIG. 16 is a modular control valve system according to the present invention, including bar manifold mounting, shown in top view.

At least two types of mountings are possible for the modular apparatus 50, 50' of the present invention, including single sub-plate mounting and bar manifold mounting. Accordingly, single sub-plate mounting is shown in FIG. 15, and bar manifold mounting is shown in FIG. 16, as well-known in the art.

Remote PCM and PSM

Referring now to FIG. 17, the PCM 54 and PSM 58 can be connected remotely from the VBM 52, as previously mentioned, in which an electronic control module 160 permits remote operation of the PCM 54 and PSM 58 to control operation of the VBM 52. More specifically, a housing 162 (shown with cover removed) encloses one or more microprocessor modules 164, 166, which can be used to control and monitor the modular apparatus 50, 50'. By techniques known in the art, one or more serial ports 168 can be used to communicate between the one or more microprocessor modules 164, 166, and modular apparatus 50, 50' including, utilizing, for example, interfacing components such as valve outputs 170, command inputs 172, and power inputs 174. Accordingly, the one or more serial ports 168 relay functional data to hand-held or remotely located receiving devices (not shown). Representative microprocessor modules 164, 166 are available from Parker Hannifin Corporation of Cleveland, Ohio, Part Number IQAN-TOC-2, as well as other commercially-available, suitable products. In a preferred embodiment, the representative microprocessor modules 164, 166 have an operating temperature of −40° C. to +70° C., supply voltage of 9 volts DC to 24 volts DC, and are capable of controlling up to four or more modular apparatuses 50, 50'.

To power the electronic module 160, a PSM 58' preferably operates in conjunction with a programmable logic control ("PLC") device 176. A representative PSM 58' is available from Moeller Electric Corporation of Franklin, Mass., Part Number EASY 400-POW, as well as other commercially-available, suitable products. In a preferred embodiment, the PSM 58' has an operating temperature of −25° C. to +55° C., input supply voltages of 90–375 volts DC, 85–264 volts AC, and 43–67 Hertz at 1.25 amps, and output voltages of 9–24 volts DC. Preferably, it is capable of controlling up to four or more modular apparatuses 50, 50'. A representative PLC device 176 is available from Moeller Electric Corporation of Franklin, Mass., Part Number EASY 412-AC-DC Relay, as well as other commercially-available, suitable products. In a preferred embodiment, the PLC device 176 has an operating temperature of −25° C. to +55° C., input supply voltages of 90–264 volts AC, 50–60 Hertz at 40 milli amps or less, eight digital inputs, preferably at a low of 0 volts AC to 40 volts AC and a high of 79 volts AC to 264 volts AC, and outputs on four isolated relay outputs rated at 8 amps at 250 volts AC. Preferably, it can be networked, utilizes front display and programming keys, forty-one lines of logic, and eight counters or timers, including a daily or weekly or monthly or yearly timer. An optional memory card can be used, and expansion units are available. Parameters can be changed from the display, and password protection can be utilized if desired. Preferably, it is capable of controlling up to four or more modular apparatuses 50, 50'.

As described, the ability to control multiple modular apparatuses 50, 50' is particularly beneficial with bar manifold mounting, as shown in FIG. 16.

Operational Benefits

Having now described the modular apparatus 50, 50', including its four principal modules (i.e., the VBM 52, PCM 54, TIM 56, and PSM 58) and five optional modules (i.e., the PRM 120, DM 122, LSM 124, PFSM 126, and MOM 128), several of its operational benefits will now also be described for representative, and therefore non-limiting, purposes.

Relative to the prior art apparatus 10, the modular apparatus 50, 50' provides a modular, more compact, smaller envelope, lower power, lighter weight, faster, and more responsive design, preferably capable of on-off, proportional, and servo operation. Two-way, three-way, and four-way direct and pilot control functionality is provided, as is JIC, CETOP, and ISO mounting compatibilities, suitable for both sub-plate and bar manifold mountings. Due to the modular design, manufacturing, maintenance, field repairs, and changes are simplified, as well as requiring fewer parts in inventories. For example, by incorporating a PSM 58 that is capable of i) 12–48 volts DC input to 12 volts DC output power supply conversion, and ii) 120–240 volts AC input to 12 volts DC output power supply conversion at 50–60 Hertz, global input voltage and frequencies can be accommodated by the single module, allowing interoperability throughout the world. Accordingly, separately stocking one or more of 12 volts DC, 24 volts DC, 120 volts AC, 240 volts AC, and 460 volts AC coils, as well as separate solenoids for on-off, proportional, and servo operations, are no longer required.

In addition, one or more of pressure reducing, diagnostic, load sensing, position feedback sensing, and manual operation capabilities can be provided, as needed or desired. For example, by imparting pressure reducing capabilities internal to the modular apparatus 50, 50' via the PRM 120, the internal reducing allows lower pilot pressure requirements, which, in turn, allow low power requirements from the PSM 58 as opposed to the one or more solenoids 26 of the prior art apparatus 10.

As previously mentioned, on-off, proportional, and servo operations can also be accommodated by a single module. Moreover, in a preferred embodiment, commercially available hardware is used for the PCM 54, TIM 56, PSM 58, PRM 120, DM 122, LSM 124, PFSM 126, and MOM 128.

It should be understood that this Specification describes exemplary, representative, and non-limiting embodiments of the invention. Accordingly, the spirit and scope of this invention are not limited to any of these embodiments. Rather, the details and features of these embodiments were disclosed as required. Thus, many changes and modifications—as apparent to those skilled in the art—are within the scope of the invention without departing from the spirit hereof, and the inventive arrangements are inclusive thereof.

The invention claimed is:

1. A valve base module, comprising:
   a valve housing having a longitudinal bore extending about a longitudinal axis of said valve housing;
   a valve element disposed within said longitudinal bore, said valve element having one or more lands that divide said longitudinal bore into a plurality of chambers; and
   a tank core passage connecting at least some of said chambers, said tank core passage extending within a plane containing said longitudinal axis, said plane oriented in non-perpendicular relation to a surface of said valve housing comprising at least a P, T, A, and B port and standard mounting holes for mounting said valve base module to at least one of a sub-plate or bar manifold.

2. The valve base module of claim 1, wherein said plane is disposed at an offset angle $\alpha$ relative to a second plane containing said longitudinal axis, said second plane oriented perpendicular to said surface.

3. The valve base module of claim 2, wherein said plane is substantially perpendicular to said second plane.

4. The valve base module of claim 2, wherein said plane is perpendicular to said second plane.

5. The valve base module of claim 2, wherein said offset angle $\alpha$ satisfies a relation $0<\alpha<360°$.

6. The valve base module of claim 2, wherein said offset angle $\alpha$ satisfies a relation $\alpha\approx 90°$.

7. The valve base module of claim 2, wherein said offset angle $\alpha$ satisfies a relation $\alpha=90°$.

8. The valve base module of claim 2, wherein said offset angle $\alpha$ permits one or more of at least said P, T, A, and B ports to connect a first surface of said valve housing to an opposing second surface of said valve housing.

9. The valve base module of claim 2, wherein said offset angle $\alpha$ permits one or more of at least said P, T, A, and B ports to connect a first surface of said valve housing to an opposing second surface of said valve housing to form one or more of at least P', T', A', and B' ports.

10. The valve base module of claim 2, wherein said offset angle $\alpha$ permits one or more of at least said P, T, A, and B ports to connect a first surface of said valve housing to an opposing second surface of said valve housing to form one or more of at least P', T', A', and B' ports that permit one or more additional modules to be mounted thereto.

11. The valve base module of claim 2, wherein said offset angle $\alpha$ permits one or more of at least said P, T, A, and B ports to connect a first surface of said valve housing to an opposing second surface of said valve housing to form one or more of at least P', T', A', and B' ports that permit one or more additional modules to be mounted thereto, wherein said first surface conforms to a standard mounting pattern.

12. The valve base module of claim 1, wherein said valve element is moveable within said longitudinal bore.

13. The valve base module of claim 1, further comprising means for moving said valve element within said longitudinal bore.

14. The valve base module of claim 13, wherein said means for moving said valve element comprise means selected from a group consisting of manual means, mechanical means, electrical means, magnetic means, hydraulic means, and pneumatic means.

15. The valve base module of claim 1, wherein said valve base module operates as a two-way, three-way, or four-way valve.

16. The valve base module of claim 1, wherein said valve base module is of unitary construction.

17. The valve base module of claim 5, wherein $\alpha\neq 180°$.

18. The valve base module of claim 1, wherein said surface conforms to a standard mounting pattern.

19. The valve base module of claim 18, wherein said standard mounting pattern is a DO3 valve pattern or equivalent.

20. The valve base module of claim 18, wherein said standard mounting pattern is a DO5 valve pattern or equivalent.

21. The valve base module of claim 18, wherein said standard mounting pattern is a DO8 valve pattern or equivalent.

22. The valve base module of claim 1, wherein said valve base module is configured for use in industrial markets.

23. The valve base module of claim 1, wherein said valve base module is configured for use in mobile markets.

24. The valve base module of claim 1, wherein said tank core passage directly connects said chambers.

25. The valve base module of claim 1, wherein said valve base module contains a single tank core passage.

26. The valve base module of claim 1, wherein said valve base module is not directly actuable by one or more electromagnetic devices.

27. A modular valve system, comprising:
   i) a valve base module, comprising:
      a valve housing having a longitudinal bore extending about a longitudinal axis of said valve housing;
      a valve element disposed within said longitudinal bore, said valve element having one or more lands that divide said longitudinal bore into a plurality of chambers; and
      a tank core passage connecting at least some of said chambers, said tank core passage extending within a plane containing said longitudinal axis, said plane oriented in non-perpendicular relation to a surface of said valve housing comprising at least a P, T, A, and B port and standard mounting holes for mounting said valve base module to at least one of a sub-plate or bar manifold; and
   ii) a pilot control module in communication with said valve base module, said pilot control module configured to be able to move said valve element within said longitudinal bore.

28. The modular valve system of claim 27, wherein said pilot control module contains a pilot control valve assembly.

29. The modular valve system of claim 28, wherein said pilot control valve assembly is an integrated component of said pilot control module.

30. The modular valve system of claim 27, wherein said pilot control valve assembly is configured to actuate said pilot control module in on-off operation.

31. The modular valve system of claim 27, wherein said pilot control valve assembly is configured to actuate said pilot control module in proportional operation.

32. The modular valve system of claim 27, wherein said pilot control valve assembly is configured to actuate said pilot control module in servo operation.

33. The modular valve system of claim 27, wherein said pilot control valve assembly is configured to actuate said pilot control module in at least more than one of on-off operation, proportional operation, and servo operation.

34. A modular valve system, comprising:
i) a valve base module, comprising:
a valve housing having a longitudinal bore extending about a longitudinal axis of said valve housing;
a valve element disposed within said longitudinal bore, said valve element having one or more lands that divide said longitudinal bore into a plurality of chambers; and
a tank core passage connecting at least some of said chambers, said tank core passage extending within a plane containing said longitudinal axis, said plane oriented in non-perpendicular relation to a surface of said valve housing comprising at least a P, T, A, and B port and standard mounting holes for mounting said valve base module to at least one of a sub-plate or bar manifold;
ii) a pilot control module in communication with said valve base module, said pilot control module configured to move said valve element within said longitudinal bore; and
iii) a power supply module in communication with said pilot control module, said power supply module configured to operate said pilot control module.

35. The modular valve system of claim 34, wherein said power supply module is a low power device.

36. The modular valve system of claim 34, wherein said power supply module accepts universal inputs.

37. The modular valve system of claim 36, wherein said universal inputs include at least one or more of a 12 volt DC input, 24 volt DC input, 48 volt DC input, 120 volt AC input, 250 volt AC input, 460 volt AC input, 50 Hertz input, and 60 Hertz input.

38. A modular valve system, comprising:
i) a valve base module, comprising:
a valve housing having a longitudinal bore extending about a longitudinal axis of said valve housing;
a valve element disposed within said longitudinal bore, said valve element having one or more lands that divide said longitudinal bore into a plurality of chambers; and
a tank core passage connecting at least some of said chambers, said tank core passage extending within a plane containing said longitudinal axis, said plane oriented in non-perpendicular relation to a surface of said valve housing comprising at least a P, T, A, and B port and standard mounting holes for mounting said valve base module to at least one of a sub-plate or bar manifold;
ii) a pilot control module in communication with said valve base module, said pilot control module configured to move said valve element within said longitudinal bore;
iii) a power supply module in communication with said pilot control module, said power supply module configured to operate said pilot control module; and
iv) a thermally insulating module to thermally isolate said pilot control module from said power supply module.

39. A modular valve system, comprising:
i) a valve base module, comprising:
a valve housing having a longitudinal bore extending about a longitudinal axis of said valve housing;
a valve element disposed within said longitudinal bore, said valve element having one or more lands that divide said longitudinal bore into a plurality of chambers; and
a tank core passage connecting at least some of said chambers, said tank core passage extending within a plane containing said longitudinal axis, said plane oriented in non-perpendicular relation to a surface of said valve housing comprising at least a P, T, A, and B port and standard mounting holes for mounting said valve base module to at least one of a sub-plate or bar manifold; and
ii) a pressure reducing module in communication with said valve base module, said pressure reducing module configured to be able to reduce pressure to said valve base module.

40. The modular valve system of claim 39, wherein said pressure reducing module contains a pressure reducing valve cartridge.

41. The modular valve system of claim 40, wherein said pressure reducing valve cartridge is an integrated component of said pressure reducing module.

42. A modular valve system, comprising:
i) a valve base module, comprising:
a valve housing having a longitudinal bore extending about a longitudinal axis of said valve housing;
a valve element disposed within said longitudinal bore, said valve element having one or more lands that divide said longitudinal bore into a plurality of chambers; and
a tank core passage connecting at least some of said chambers, said tank core passage extending within a plane containing said longitudinal axis, said plane oriented in non-perpendicular relation to a surface of said valve housing comprising at least a P, T, A, and B port and standard mounting holes for mounting said valve base module to at least one of a sub-plate or bar manifold;
ii) a diagnostic module in communication with said valve base module, said diagnostic module configured to be able to communicate data about said valve base module.

43. The modular valve system of claim 42, wherein said diagnostic module contains a shuttle valve assembly.

44. The modular valve system of claim 43, wherein said shuttle valve assembly is an integrated component of said diagnostic module.

45. A modular valve system, comprising:
i) a valve base module, comprising:
a valve housing having a longitudinal bore extending about a longitudinal axis of said valve housing;
a valve element disposed within said longitudinal bore, said valve element having one or more lands that divide said longitudinal bore into a plurality of chambers; and
a tank core passage connecting at least some of said chambers, said tank core passage extending within a plane containing said longitudinal axis, said plane oriented in non-perpendicular relation to a surface of said valve housing comprising at least a P, T, A, and B port and standard mounting holes for mounting said valve base module to at least one of a sub-plate or bar manifold; and ii) a load sense module in communication with said valve base module, said load sense module configured to be able to sense a highest load pressure between at least some of said chambers.

46. A modular valve system, comprising:

i) a valve base module, comprising:

a valve housing having a longitudinal bore extending about a longitudinal axis of said valve housing;

a valve element disposed within said longitudinal bore, said valve element having one or more lands that divide said longitudinal bore into a plurality of chambers; and a tank core passage connecting at least some of said chambers, said tank core passage extending within a plane containing said longitudinal axis, said plane oriented in non-perpendicular relation to a surface of said valve housing comprising at least a P, T, A, and B port and standard mounting holes for mounting said valve base module to at least one of a sub-plate or bar manifold; and ii) a position feedback sensor module in communication with said valve base module, said position feedback sensor module configured to be able to sense a position of said valve element within said longitudinal bore.

47. The modular valve system of claim 46, wherein said position feedback sensor module attaches directly to said valve element.

48. A modular valve system, comprising:

i) a valve base module, comprising:

a valve housing having a longitudinal bore extending about a longitudinal axis of said valve housing;

a valve element disposed within said longitudinal bore, said valve element having one or more lands that divide said longitudinal bore into a plurality of chambers; and a tank core passage connecting at least some of said chambers, said tank core passage extending within a plane containing said longitudinal axis, said plane oriented in non-perpendicular relation to a surface of said valve housing comprising at least a P, T, A, and B port and standard mounting holes for mounting said valve base module to at least one of a sub-plate or bar manifold; and ii) a manual override module in communication with said valve base module, said manual override module configured to be able to manually control said valve base module.

49. The modular valve system of claim 48, wherein said manual override module attaches directly to said valve element.

50. A valve base module, comprising:

a valve housing having a longitudinal bore extending about a longitudinal axis of said valve housing;

a valve element disposed within said longitudinal bore, said valve element having one or more lands that divide said longitudinal bore into a plurality of chambers; and means for connecting one or more of at least P, T, A, and B ports from a bottom surface of said valve housing to a top surface of said valve housing, said means comprising a tank core passage connecting at least some of said chambers, said tank core passage extending within a plane containing said longitudinal axis, said plane oriented in non-perpendicular relation to a surface of said valve housing comprising at least a P, T, A, and B port and standard mounting holes for mounting said valve base module to at least one of a sub-plate or bar manifold.

51. A valve base module, comprising:

a valve housing having a bore extending about an axis of said valve housing;

a valve element disposed within said bore, said valve element having one or more lands that divide said bore into a plurality of chambers; and a tank core passage connecting at least some of said chambers, said tank core passage extending within a plane containing said axis, said plane oriented in non-perpendicular relation to a surface of said valve housing comprising at least a P, T, A, and B port and standard mounting holes for mounting said valve base module to at least one of a sub-plate or bar manifold.

52. A valve base module, comprising:

a valve housing having a bore;

a valve element disposed within said bore, said valve element having one or more lands that divide said bore into a plurality of chambers; and a tank core passage connecting at least some of said chambers, said tank core passage extending within a plane that is oriented in non-perpendicular relation to a surface of said valve housing comprising at least a P, T, A, and B port and standard mounting holes for mounting said valve base module to at least one of a sub-plate or bar manifold.

53. A valve base module, comprising:

a valve housing having one or more chambers disposed about a bore of said housing; and a tank core passage connecting one or more of said chambers, said tank core passage extending within a plane that is oriented in non-perpendicular relation to a surface of said valve housing comprising at least a P, T, A, and B port and standard mounting holes for mounting said valve base module to at least one of a sub-plate or bar manifold.

54. A valve housing, comprising:

one or more chambers disposed about a bore of said housing;

a tank core passage connecting one or more of said chambers, said tank core passage extending within a plane that is oriented in non-perpendicular relation to a surface of said valve housing comprising at least a P, T, A, and B port and standard mounting holes for mounting said housing to at least one of a sub-plate or bar manifold.

55. A valve base module, comprising a:

A. Housing, comprising:

1. First and second opposing surfaces, the first surface containing:
   a. P, T, A, and B ports, and
   b. Standard mounting holes for mounting the module to at least one of a sub-plate or bar manifold,
   the first surface defining a first plane;
2. Third and fourth opposing surfaces each contiguous with the first and second surfaces;
3. Fifth and sixth opposing surfaces each contiguous with the first, second, third, and fourth surfaces; and
4. A bore (i) extending along an axis that is intermediate between the first, second, third, and fourth surfaces, and (ii) terminating in at least one of the fifth and sixth surfaces;

B. Valve element disposed within the bore, the element having at least one land that divides the bore into at least two chambers; and
C. Tank core passage (i) connecting at least of the two chambers, and (ii) defining a second plane that contains the axis and is either parallel to or intersects at a non-perpendicular angle with the first plane.

56. The valve base module of claim 55, in which the housing is in the shape of a rectangular box.

57. The valve base module of claim 55, in which the bore terminates in both in both of the fifth and sixth surfaces.

58. The valve base module of claim 55, in which the first plane is parallel to the second plane.

59. The valve base module of claim 55, in which the standard mounting holes are selected from a group consisting of a DO3, DO5, and DO8 valve pattern.

* * * * *